United States Patent
Noguchi et al.

(10) Patent No.: US 11,455,162 B2
(45) Date of Patent: Sep. 27, 2022

(54) SOFTWARE REWRITING DEVICE

(71) Applicant: HONDA MOTOR CO., LTD., Tokyo (JP)

(72) Inventors: Junpei Noguchi, Saitama (JP); Gaku Shimamoto, Saitama (JP); Yuta Takada, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/204,443

(22) Filed: Mar. 17, 2021

(65) Prior Publication Data

US 2021/0294591 A1   Sep. 23, 2021

(30) Foreign Application Priority Data

Mar. 19, 2020   (JP) .............................. JP2020-050288

(51) Int. Cl.
*G06F 9/445*   (2018.01)
*G06F 8/65*   (2018.01)

(52) U.S. Cl.
CPC ..................................... *G06F 8/65* (2013.01)

(58) Field of Classification Search
CPC ....................................................... G06F 8/65
See application file for complete search history.

(56) References Cited

U.S. PATENT DOCUMENTS 9,031,715 B2 * 5/2015 Suganuma .............. B60R 16/02
701/2

FOREIGN PATENT DOCUMENTS

JP   2010-243339 A   10/2010

* cited by examiner

*Primary Examiner* — Chuck O Kendall
(74) *Attorney, Agent, or Firm* — Paratus Law Group, PLLC

(57) ABSTRACT

A software rewriting device, configured to rewrite software of a moving body, includes: a required time acquisition unit configured to acquire information regarding a required time for rewriting the software; a scheduled stop time acquisition unit configured to acquire information regarding a scheduled stop time at a predetermined position of the moving body; and a rewriting processing unit configured to execute a rewriting process of rewriting the software. When the required time is shorter than the scheduled stop time based on the information regarding the required time and the information regarding the scheduled stop time, the rewriting processing unit executes the rewriting process at the predetermined position, and when the required time is longer than the scheduled stop time based on the information regarding the required time and the information regarding the scheduled stop time, the rewriting processing unit does not execute the rewriting process at the predetermined position.

6 Claims, 11 Drawing Sheets

| | TYPE OF PARKING SPACE | | PARKING INFORMATION | |
|---|---|---|---|---|
| PARKING SPACE ID | ENERGY SOURCE SUPPLY POSSIBILITY | COMMUNICATION ENVIRONMENT (RADIO WAVE INTENSITY) | PARKING STATUS | VEHICLE ID |
| 001 | POSSIBLE | STRONG | FULL | KH001 |
| 002 | NOT POSSIBLE | STRONG | EMPTY | — |
| 003 | NOT POSSIBLE | WEAK | FULL | KH002 |
| ⋮ | ⋮ | ⋮ | ⋮ | ⋮ |

SOFTWARE REWRITING DEVICE

CROSS-REFERENCE TO RELATED APPLICATIONS

The present application claims the benefit of priority of Japanese Patent Application No. 2020-050288, filed on Mar. 19, 2020, the content of which is incorporated herein by reference.

TECHNICAL FIELD

The present invention relates to a software rewriting device capable of rewriting software of a moving body.

BACKGROUND ART

In recent years, vehicles have been digitized and in-vehicle devices are controlled by a control device called an electronic control unit (ECU). Such a control device controls an in-vehicle device by executing a control program stored in advance in the own device. Further, a technique capable of updating the control program of such a control device is also known.

For example, JP-A-2010-243339 discloses a technique of updating a program of a control device that controls an operation of a device mounted on a vehicle when the vehicle is positioned in a safe place.

When software of a moving body is rewritten, there may be a case where some or all of the functions of the moving body cannot be used by a user. Therefore, when the software is rewritten while the user is using the moving body, the convenience of the user deteriorates, and there is room for improvement from this point of view.

SUMMARY

The invention provides a software rewriting device capable of rewriting software of a moving body while avoiding deterioration in the convenience of a user.

According to an aspect of the invention, a software rewriting device, configured to rewrite software of a moving body, including: a required time acquisition unit configured to acquire information regarding a required time for rewriting the software; a scheduled stop time acquisition unit configured to acquire information regarding a scheduled stop time at a predetermined position of the moving body; and a rewriting processing unit configured to execute a rewriting process of rewriting the software, where: when the required time is shorter than the scheduled stop time based on the information regarding the required time and the information regarding the scheduled stop time, the rewriting processing unit executes the rewriting process al the predetermined position; and when the required time is longer than the scheduled stop time based on the information regarding the required time and the information regarding the scheduled stop time, the rewriting processing unit does not execute the rewriting process at the predetermined position.

According to the aspect of the invention, software of a moving body can be rewritten while avoiding deterioration in the convenience of a user.

DESCRIPTION OF EMBODIMENTS

Hereinafter, an embodiment of the software rewriting device of the invention will be described with reference to the accompanying drawings. In the following description of the embodiment, an example will be described in which a moving body in the invention is a vehicle such as an automobile and an accommodation area in the invention is a parking lot.

First, a vehicle provided with a software rewriting device of the embodiment will be described. A vehicle (hereinafter, also referred to as vehicle M) provided with the software rewriting device of the embodiment is an automobile including a drive source (for example, a traveling driving force output device 200 described later) and wheels (for example, two wheels, three wheels, or four wheels) including driving wheels driven by the power of the drive source. As the drive source of the vehicle M, for example, an electric motor, an internal combustion engine (for example, a gasoline engine), or a combination of the electric motor and the internal combustion engine is used.

Figure 1:
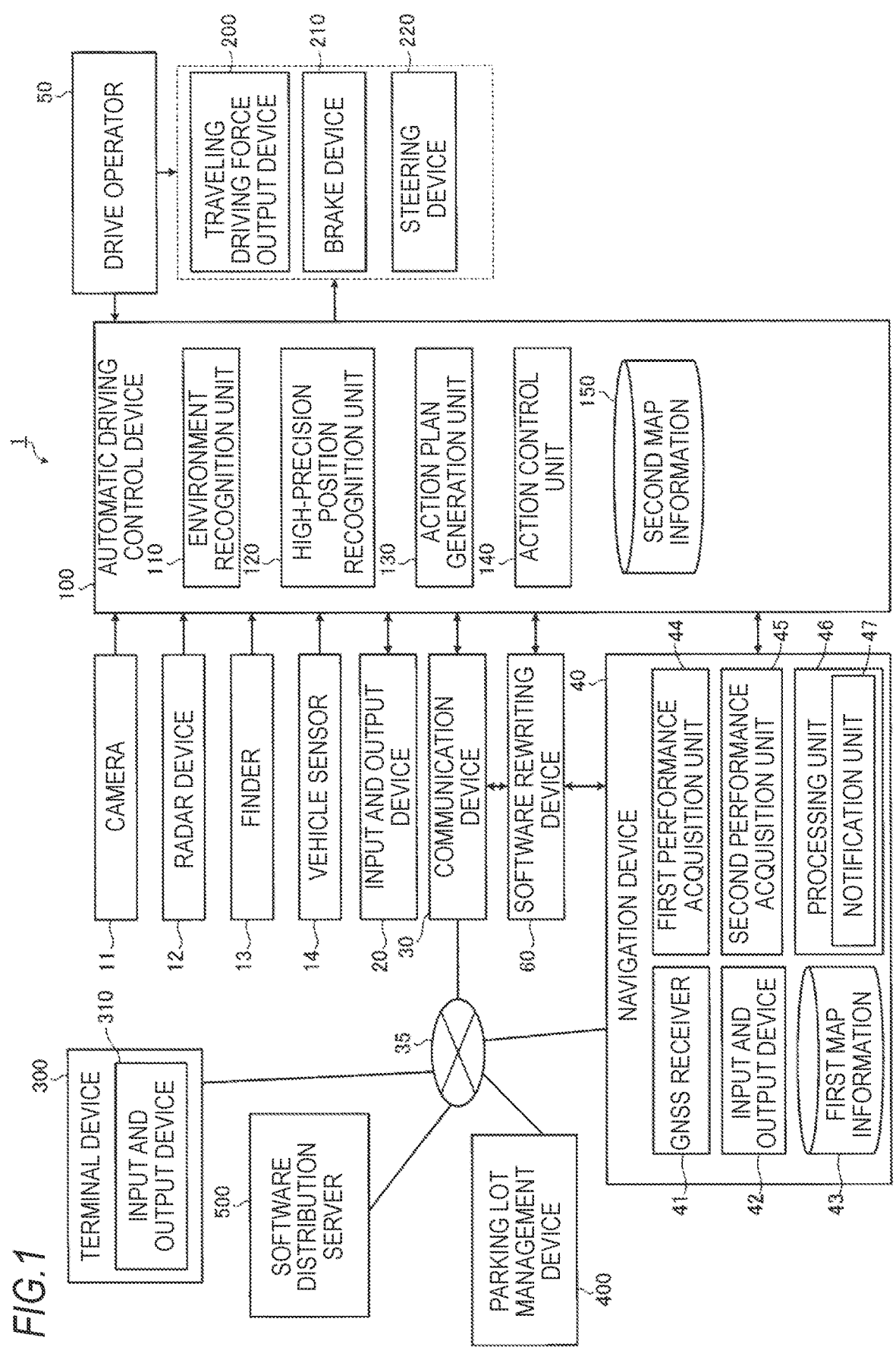
FIG. 1 is a diagram illustrating an example of a configuration of a vehicle system according to an embodiment.

Further, the vehicle M includes a vehicle system 1 illustrated in FIG. 1. The vehicle system 1 has a function capable of performing all driving tasks related to the vehicle M, at least within a limited specific area (for example, in a parking lot PA described below). Here, the driving task is, for example, a real-time driving function necessary for maneuvering the vehicle M such as controlling a left-right movement (steering) of the vehicle M, controlling of a forward-backward movement (acceleration, deceleration), and monitoring the driving environment, and a tactical function such as planning a traveling track.

As illustrated in FIG. 1, the vehicle system 1 includes a camera 11, a radar device 12, a finder 13, a vehicle sensor 14, an input and output device 20, a communication device 30, a navigation device 40, an drive operator 50, a software rewriting device 60, an automatic driving control device 100, the traveling driving force output device 200, a brake device 210, and a steering device 220. The respective devices are communicably connected to each other by a wired or wireless communication network. The communication network connecting the respective devices is, for example, controller area network (CAN).

The camera 11 is a digital camera which photographs the periphery (for example, in front of vehicle M) of the vehicle M and outputs image data obtained by the photographing to the automatic driving control device 100. The radar device 12 is, for example, a radar device using radio waves in a millimeter wave band, detects a position of an object in the vicinity (for example, in front of, behind, and to the side of vehicle M) of the vehicle M, and outputs the detection result to the automatic driving control device 100.

The finder 13 is, for example, laser imaging detection and ranging (LIDAR). The finder 13 uses a predetermined laser beam to measure the distance to an object (target object) around (for example, in front of, behind, and to the side of the vehicle M) the vehicle M and outputs the measurement result to the automatic driving control device 100.

The vehicle sensor 14 includes, for example, a vehicle speed sensor which detects the speed of the vehicle M, an acceleration sensor which detects the acceleration of the vehicle M, an angular velocity sensor which detects the angular velocity around an vertical axis of the vehicle M, an orientation sensor which detects the orientation of the vehicle M, and the like. Further, the vehicle sensor 14 includes a radio wave intensity sensor which detects the radio wave intensity (that is, the communication environment) used by the communication device 30 for communication. The vehicle sensor 14 outputs the detection result of each sensor to the automatic driving control device 100. The automatic driving control device 100 may output the detection result each sensor of the vehicle sensor 14 to the software rewriting device 60 or the like.

The input and output device 20 includes an output device which outputs various information to a user of the vehicle M (hereinafter, also simply referred to as a user) and an input device which accepts various input operations from a user. In the embodiment, a user is not limited to a person who manages or owns the vehicle M and uses the vehicle M. For example, a user may be a person who uses the vehicle M on their behalf at the request of a person who manages or owns the vehicle M.

The output device of the input and output device 20 is, for example, a display which displays information based on a processing result of the automatic driving control device 100. The output device may be a speaker, a buzzer, an indicator light, or the like. Further, the input device of the input and output device 20 is, for example, a touch panel or an operation button (key, switch, or the like) which outputs an operation signal corresponding to an input operation received from a user to the automatic driving control device 100.

The communication device 30 is wirelessly connected to a network 35 and communicates with another device provided outside the vehicle system 1 via the network 35. The network 35 includes, for example, a mobile communication network, a Wi-Fi network, Bluetooth (registered trademark), dedicated short range communication (DSRC), and the like.

The communication device 30 communicates with, for example, a terminal device 300 carried by a user, a parking lot management device 400 which manages the parking lot PA where the vehicle M can be parked, a software distribution server 500 which distributes the software of the vehicle M, and the like. The terminal device 300 is, for example, a smartphone or a tablet terminal and is an electronic device connected to the network 35 and including an input and output device 310. The input and output device 310 is, for example, a display which displays various information to a user, a touch panel which accepts a user's input operation, and the like. Further, the software distribution server 500 is, for example, a server device managed by a manufacturer (for example, a manufacturer) of the vehicle M. The parking lot PA and the parking lot management device 400 will be described below.

The navigation device 40 includes a global navigation satellite system (GNSS) receiver 41 and an input and output device 42. Further, the navigation device 40 includes a storage device (not illustrated) such as a hard disk drive (hereinafter, also referred to as HDD) and a flash memory, and first map information 43 is stored in the storage device. The first map information 43 is, for example, information representing a road shape by a link indicating a road and a node connected by the link. Further, the first map information 43 may include information representing the curvature of the road and the point of interest (POI).

The GNSS receiver 41 identifies the latitude and longitude of a point where the vehicle M is located as the position of the vehicle M based on the signal received from the GNSS satellite. Further, the navigation device 40 may specify or correct the position of the vehicle M by an inertial navigation system (INS) using the output of the vehicle sensor 14.

The input and output device 42 includes an output device which outputs various kinds of information to a user and an input device which accepts various input operations from a user. The output device of the input and output device 42 is, for example, a display which displays information (for example, displays a route on a map described below) based on the processing result of the navigation device 40. Further, the input device of the input and output device 42 is, for example, a touch panel or an operation button (key, switch, or the like) which outputs an operation signal corresponding to the input operation received from a user to the navigation device 40. The input and output device 42 may be shared with the input and output device 20.

Although detailed description is omitted, the navigation device 40 determines, for example, a route (hereafter, also referred to as the route on the map) from the position of the vehicle M specified by the GNSS receiver 41 to a destination input by a user with reference to the first map information 43. Then, the navigation device 40 guides a user on the determined route on the map by the input and output device 42. Further, the navigation device 40 is configured to be able to output information indicating the specified position of the vehicle M and the determined route on the map to the software rewriting device 60, the automatic driving control device 100, or the like. A first performance acquisition unit 44, a second performance acquisition unit 45, a processing unit 46 including a notification unit 47, and the like illustrated in FIG. 1 will be described below.

Some or all the functions of the navigation device 40 may be realized by the terminal device 300. Further, some or all the functions of the navigation device 40 may be realized by an external server device (navigation server) capable of communicating with the vehicle system 1 by the communication device 30 or the like.

The drive operator 50 is various operators such as an accelerator pedal, a brake pedal, a shift lever, a steering wheel, a deformed steering wheel, and a joystick. The drive operator 50 is provided with a sensor which detects the amount of operation or the presence of operation on the drive operator 50. The detection result by the sensor of the drive operator 50 is output to a part or all of the automatic driving control device 100, the traveling driving force output device 200, the brake device 210, and the steering device 220.

The traveling driving force output device 200 outputs a traveling driving force (torque) for the vehicle M to travel to the driving wheels. The traveling driving force output device 200 includes, for example, an electric motor and an electric motor electronic control unit (ECU) which controls the electric motor. The electric motor ECU controls the electric motor based on the detection result by the sensor of the drive operator 50 (for example, the accelerator pedal) and the control information from the automatic driving control device 100. Further, when the vehicle M includes an internal combustion engine or a transmission as a drive source, the traveling driving force output device 200 may include an internal combustion engine or a transmission and an ECU for controlling the combustion engine or the transmission.

The brake device 210 includes, for example, a brake caliper, a cylinder which transmits hydraulic pressure to the brake caliper, an electric motor which generates hydraulic pressure in the cylinder, and a brake ECU. Based on the detection result by the sensor of the drive operator 50 (for example, the brake pedal) and the control information from the automatic driving control device 100, the brake ECU controls the electric motor of the brake device 210 so that the brake torque corresponding to the braking operation is output to each wheel.

The steering device 220 includes, for example, a steering ECU and an electric motor. The electric motor of the steering device 220, for example, applies a force to the rack and pinion mechanism to change the direction of the steering wheel. Based on the detection result by the sensor of the drive operator 50 (for example, the steering wheel) and the control information from the automatic driving control device 100, the steering ECU drives the electric motor of the steering device 220 to change the direction (that is, the steering angle) of the steering wheels.

The automatic driving control device 100 includes an environment recognition unit 110, a high-precision position recognition unit 120, an action plan generation unit 130, and an action control unit 140. Further, the automatic driving control device 100 includes a storage device (not illustrated) realized by a flash memory or the like to which each functional unit (for example, the high-precision position recognition unit 120) of the automatic driving control device 100 can access and second map information 150 is stored in the storage device.

The second map information 150 is more accurate map information than the first map information 43. The second map information 150 includes, for example, information indicating the center of a lane, information indicating a lane boundary line (for example, a road lane marking), and the like. Further, the second map information 150 may include road information, traffic regulation information, address information, facility information, telephone number information, and the like.

Further, the second map information 150 may be updated at any time by the communication device 30 communicating with another device. For example, when the vehicle M enters the parking lot PA, the communication device 30 receives information (hereafter, also referred to as in-parking-lot map information) indicating the lane in the parking lot PA, the position of each parking space, and the like from the parking lot management device 400. Then, the automatic driving control device 100 updates the second map information 150 to incorporate the received in-parking-lot map information into the second map information 150. As a result, the automatic driving control device 100 can specify the position of each parking space in the parking lot PA with reference to the second map information 150.

The environment recognition unit 110 performs sensor fusion processing on information acquired by a part or all of the camera 11, the radar device 12, and the finder 13, such that the environment recognition unit 110 recognizes an object around the vehicle M and recognizes its position. The environment recognition unit 110 recognizes, for example, an obstacle, a road shape, a traffic light, a guardrail, a utility pole, a surrounding vehicle (including traveling conditions such as speed and acceleration and parking conditions), a lane mark, a pedestrian, and the like and recognizes their positions.

Referring to the position of the vehicle M specified by the navigation device 40, the detection result by the vehicle sensor 14, the image taken by the camera 11, the second map information, and the like, the high-precision position recognition unit 120 recognizes the detailed position and attitude of the vehicle M. The high-precision position recognition unit 120 recognizes, for example, the traveling lane in which the vehicle M is traveling or recognizes the relative position and attitude of the own vehicle with respect to the traveling lane. Further, the high-precision position recognition unit 120 also recognizes, for example, the position of the vehicle M in the parking lot PA.

The action plan generation unit 130 generates an action plan for the vehicle M. Specifically, the action plan generation unit 130 generates a target track on which the vehicle M will travel in the future as an action plan of the vehicle M. The target track is, for example, information in which points (track points) to be reached by the vehicle M are disposed for each predetermined mileage (for example, about several meters). Further, the target track may include information on speed elements such as the target speed and the target acceleration of the vehicle M at each predetermined time or at each track point. The action plan generation unit 130 generates an action plan according to the instructions of the parking lot management device 400 received by the communication device 30, for example.

The action control unit 140 controls the vehicle M to act according to the action plan generated by the action plan generation unit 130. Specifically, the action control unit 140 controls the traveling driving force output device 200, the brake device 210, and the steering device 220 so that the vehicle M passes the target track generated by the action plan generation unit 130 at the scheduled time. The action control unit 140 controls, for example, the traveling driving force output device 200 and the brake device 210 based on the speed element associated with the target track and controls the steering device 220 according to a curvature degree of the target track.

Each functional unit included in the automatic driving control device 100 is realized, for example, by the central processing unit (CPU) executing a predetermined program (software). Further, a part or all of the functional parts of the automatic driving control device 100 may be realized by hardware such as large scale integration (LSI), application specific integrated circuit (ASIC), field-programmable gate array (FPGA), graphics processing unit (GPU), and for example, the storage device for storing the second map information 150 and the high-precision position recognition unit 120 may be realized by a map positioning unit (MPU). Further, a part or all of the functional parts included in the automatic driving control device 100 may be realized by the cooperation of software and hardware.

The software rewriting device 60 is configured to be able to communicate with other devices external to the vehicle system 1 via the communication device 30 and is configured to be able to communicate with other devices in the vehicle system 1 such as the navigation device 40 and the automatic driving control device 100. Then, the software rewriting device 60 communicates with the other devices and performs a rewriting process for rewriting the software of the vehicle M.

Here, the software of the vehicle M is, for example, a program for operating an in-vehicle device such as the navigation device 40 or the automatic driving control device 100, so-called firmware. Further, the software of the vehicle M may be data and may be, for example, the first map information 43, the second map information 150, or differential data for updating the data. Further, the software of the vehicle M may be the firmware of the software rewriting device 60 itself.

The software rewriting device 60 downloads (that is, receives) the software of the vehicle M from, for example, the software distribution server 500 and performs a rewriting process of rewriting the software to the downloaded software. For example, when new firmware for the automatic driving control device 100 is downloaded from the software distribution server 500, the software rewriting device 60 performs a rewriting process of rewriting the firmware of the automatic driving control device 100 with the new downloaded firmware. By performing such a rewriting process by the software rewriting device 60, it is possible to stabilize the operation of the device in which the software has been rewritten, improve the performance, add functions, and the like. An example of the configuration of the software rewriting device 60 will be described below with reference to FIG. 3 and the like.

Figure 2:
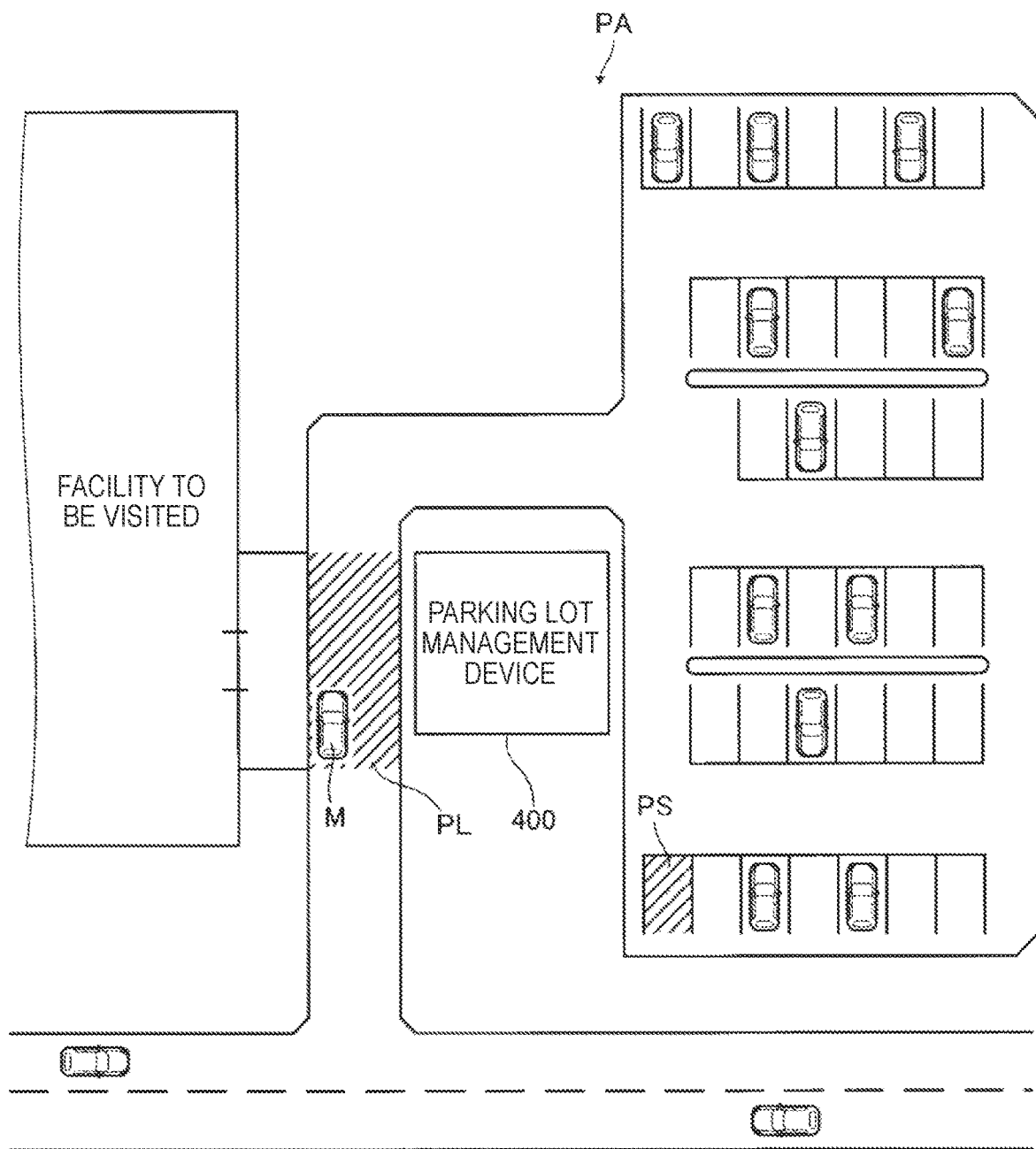
FIG. 2 is a diagram illustrating an example of a parking lot managed by a parking lot management device.

Next, an example of the parking lot PA in which the vehicle M can be parked will be described with reference to FIG. 2. As illustrated in FIG. 2, the parking lot PA is an automatic valet parking type parking lot attached to a facility to be visited by a user and is managed by the parking lot management device 400. The parking lot PA includes a plurality of parking spaces PS where a vehicle (for example, vehicle M) can be parked and a platform PL provided right before the plurality of parking spaces PS. Hereinafter, an example in which a user uses the parking lot PA, that is, the vehicle M is admitted to the parking lot PA will be described.

Prior to using the parking lot PA, a user makes a reservation (hereinafter, also referred to as a parking reservation) for using the parking lot PA using the navigation device 40, the terminal device 300, or the like. The "user" is not limited to the owner and manager of the vehicle M, but includes, for example, a person (for example, a concierge) who performs procedures such as parking reservation on behalf of the owner of the vehicle M. In the parking reservation, the user inputs a vehicle ID, which is an identifier (identification information) of the vehicle M, the scheduled parking time for parking the vehicle M in the parking lot PA, and the like. As the scheduled parking time, for example, the scheduled entry date and time when the vehicle M is scheduled to enter the parking lot PA and the scheduled exit date and time when the vehicle M is scheduled to exit from the parking lot PA are input. The information entered by the user is sent to the parking lot management device 400. With reference to the received information and the management table (not illustrated) showing the parking reservation status of the parking lot PA, the parking lot management device 400 determines whether there is a parking space PS where the vehicle M can be parked during the scheduled parking time (the period from the scheduled entry date and time to the scheduled exit date and time). Then, when there is a parking space PS in which the vehicle M can be parked, the parking lot management device 400 accepts the parking reservation and notifies the user.

Next, when the scheduled parking time comes, the user rides the vehicle M on the platform PL and gets off from the vehicle M at the platform PL. After the user gets off the vehicle M, the vehicle M automatically drives and executes a self-propelled entry event to move to a predetermined parking space PS in the parking lot PA. For example, when the user gets off the vehicle M at the platform PL, the user sends a request for starting the self-propelled entry event to the parking lot management device 400 by the terminal device 300 or the like. When the parking lot management device 400 receives the start request of the self-propelled entry event, the parking lot management device 400 determines the parking space PS to which the vehicle M should be stored with reference to the parking space information table 442 described below and instructs the vehicle M to move to the parking space PS. Further, the parking lot management device 400 may also determine a route on which the vehicle M should travel to the parking space PS where the vehicle M should be stored, and instruct the vehicle M to move along the route. Then, the vehicle M moves to the parking space PS instructed by the parking lot management device 400 while performing sensing by the camera 11, the radar device 12, the finder 13, or the like according to the instruction received from the parking lot management device 400.

When exiting from the parking lot PA, the user causes the vehicle M to execute a self-propelled exit event. When the vehicle M executes a self-propelled exit event, the vehicle M automatically drives from the parked parking space PS and moves to the platform PL. For example, when the vehicle M is made to execute the self-propelled exit event, the user sends a start request of the self-propelled exit event to the parking lot management device 400 by their terminal device 300 or the like. Upon receiving the start request of the self-propelled exit event, the parking lot management device 400 instructs the vehicle M to move to the platform PL. Here, the parking lot management device 400 may also determine the route on which the vehicle M should travel to the platform PL and instruct the vehicle M to move along the route. The vehicle M which has received the instruction from the parking lot management device 400 moves to the platform PL while sensing with the camera 11, the radar device 12, the finder 13, or the like. The user gets on the vehicle M at the platform PL and exits from the parking lot PA.

Figure 3:
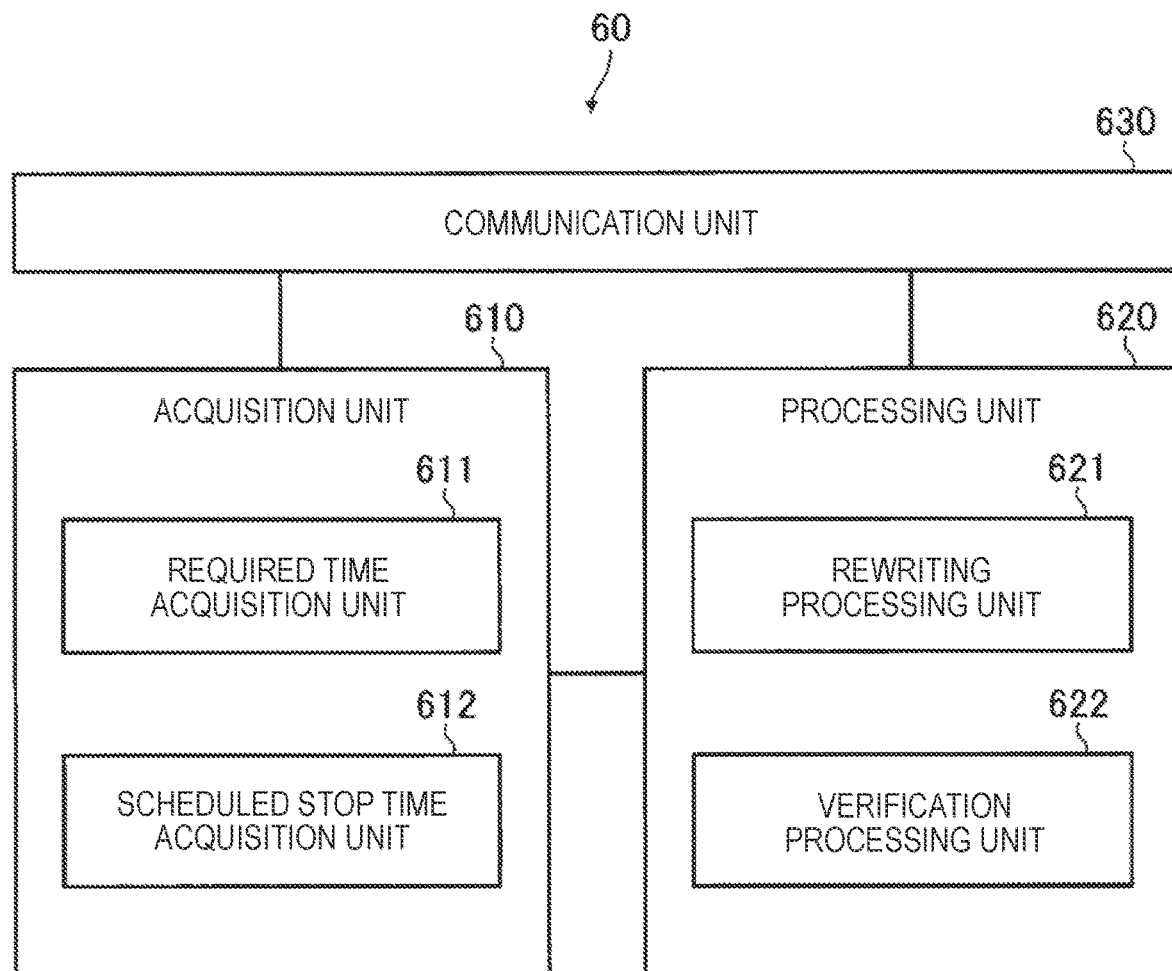
FIG. 3 is a diagram illustrating an example of a functional configuration of a software rewriting device.

Next, an example of the functional configuration of the software rewriting device 60 will be described with reference to FIG. 3. As illustrated in FIG. 3, the software rewriting device 60 includes an acquisition unit 610 which acquires various kinds of information and a processing unit 620 which performs various processing based on the information acquired by the acquisition unit 610. Further, the software rewriting device 60 includes a communication unit 630 which functions as an interface for the software rewriting device 60 to communicate with another device. The acquisition unit 610 and the processing unit 620 are configured to be able to communicate with other devices as appropriate via the communication unit 630.

Each functional unit included in the software rewriting device 60 is realized, for example, by executing a predetermined program (software) stored in advance by the central processing unit (CPU). Further, a part or all of the functional parts of the software rewriting device 60 may be realized by hardware such as large scale integration (LSI), application specific integrated circuit (ASIC), field-programmable gate array (FPGA), and graphics processing unit (GPU) or may be realized by the collaboration of software and hardware.

When rewriting the software of the vehicle M, a user may not be able to use a part (for example, the device for which the software is rewritten) or all of the vehicle system 1, which may reduce the convenience of the user. Therefore, the software rewriting device 60 rewrites the software of the vehicle M during a period when it is assumed that a user does not use the vehicle M in order to rewrite the software of the mobile body while avoiding the deterioration of the convenience of the user.

More specifically, the acquisition unit 610 includes a required time acquisition unit 611 and a scheduled stop time acquisition unit 612. The required time acquisition unit 611 acquires information indicating the required time for rewriting the software of the vehicle M. The information indicating the required time may be distributed by the software distribution server 500 or may be acquired by the required time acquisition unit 611 performing a predetermined calculation. When acquired by calculation, the required time can be obtained from, for example, the data size of the software of the vehicle M and the data size that the software rewriting device 60 or the like can rewrite per unit time. Further, the required time acquisition unit 611 may acquire a fixed time as the required time regardless of the data size of the software of the vehicle M.

The scheduled stop time acquisition unit 612 acquires information indicating the scheduled stop time at a predetermined position of the vehicle M. Here, the predetermined position is a position where the vehicle M is systematically stopped. More specifically, the predetermined position is a position in which the date and time (hereinafter, also referred to as the scheduled stop start date and time) when the vehicle M starts to stop and the date and time (hereinafter, also referred to as the scheduled stop end date and time) when the vehicle M ends the stop are predetermined.

The scheduled stop time acquisition unit 612 derives, for example, a period (time difference) from the scheduled stop start date and time at the predetermined position to the scheduled stop end date and time as the scheduled stop time at the predetermined position and acquires information indicating the derived scheduled stop time. As a result, it is possible to acquire information indicating the scheduled stop time indicating the period during which the vehicle M is likely to be stopped according to a predetermined plan.

In the embodiment, an example will be described below in which the predetermined position is the parking lot PA and the scheduled stop time at the predetermined position is the scheduled parking time in the parking lot PA. That is, the scheduled stop time acquisition unit 612 acquires information indicating the scheduled parking time in the parking lot PA of the vehicle M. The scheduled stop time acquisition unit 612 derives, for example, the period from the scheduled enter date and time entered by a user at the time of reservation (that is, parking reservation) for usage of the parking lot PA as the scheduled parking time and acquire the derived information indicating the scheduled parking time. In addition, information indicating the scheduled enter date and time and the scheduled exit date and time can be obtained from the navigation device 40 and the terminal device 300 used by a user at the time of parking reservation, the parking lot management device 400 of the parking lot PA where the parking reservation is made, and the like.

The processing unit 620 includes a rewriting processing unit 621 which executes a rewriting process for rewriting the software of the vehicle M. The rewriting processing unit 621 executes the rewriting process while the vehicle M is stopped at a predetermined position, that is, while the vehicle M is parked in the parking lot PA. As a result, the software of the vehicle M can be rewritten while the vehicle M is parked in the parking lot PA, that is, during the period when a user is not expected to use the vehicle M.

Specifically, the rewriting processing unit 621 first inquires, for example, whether the vehicle M is parked in the parking lot PA to another device such as the navigation device 40 or the automatic driving control device 100 which can identify the position of the vehicle M. As a result of the inquiry, when the vehicle M is parked in the parking lot PA, the rewriting processing unit 621 determines whether to execute the rewriting processing, based on the information indicating the required time acquired by the required time acquisition unit 611 and the information indicating the scheduled parking time acquired by the scheduled stop time acquisition unit 612.

For example, when the required time is shorter than the scheduled parking time, the rewriting processing unit 621 determines that the rewriting process is to be executed and executes the rewriting process. As a result, the rewriting processing unit 621 can execute the rewriting process and complete the rewriting process while the vehicle M is parked in the parking lot PA. Therefore, the software of the vehicle M can be rewritten while the vehicle M is parked in the parking lot PA, that is, during the period when a user is not expected to use the vehicle M. As a result, the software of the vehicle M can be rewritten while avoiding the deterioration of user convenience.

On the other hand, when the required time is longer than the scheduled parking time, the rewriting processing unit 621 determines that the rewriting process is not executed and does not execute the rewriting process. As a result, when the rewriting process cannot be completed while the vehicle M is parked in the parking lot PA, the rewriting processing unit 621 can limit the execution of the rewriting process during the period. Therefore, for example, when a user tries to use the vehicle M to exit from the parking lot PA, it is possible to avoid a situation in which the software of the vehicle M is being rewritten and part or all of the vehicle system 1 cannot be used. As a result, it is possible to prevent the convenience of the user from being lowered.

However, rewriting the software of the vehicle M without the permission of a user may cause distrust and discomfort of the user. Therefore, it is desirable that the rewriting processing unit 621 executes the rewriting process on condition that a user permits. Specifically, here, before the vehicle M is parked in the parking lot PA (for example, at the time of parking reservation), a user is made to select whether to execute the rewriting process using the input and output devices 20 and 42 and the like.

Then, the rewriting processing unit 621 executes the rewriting process when the user performs an operation to execute the rewriting process. As a result, the software of the vehicle M can be rewritten without causing distrust or discomfort of the user. On the other hand, the rewriting processing unit 621 prevents the rewriting process from being executed when a user performs an operation to the effect that the rewriting process is not executed. It is possible to prevent rewriting of the vehicle M software, which leads to distrust and discomfort of the user.

Further, as described above, the rewriting process is, for example, a process of rewriting the software with the software downloaded (that is, received) from the software distribution server 500. When the device try to download software from the software distribution server 500 in a location (for example, the location where the signal strength of the network 35 is weak) where the communication environment between the software rewriting device 60 and the software distribution server 500 is poor, the download itself is not possible, or even when download is possible, required time is long. Therefore, when the rewriting process is performed at a position where the communication environment between the software rewriting device 60 and the software distribution server 500 is poor, the rewriting process may not be completed smoothly.

Therefore, it is desirable that the rewriting processing unit 621 performs the rewriting process when the communication environment in the parking lot PA, more specifically, the communication environment of the parking space PS in which the vehicle M performing the rewriting process is parked is equal to or higher than a predetermined level. Here, when the communication environment is equal to or higher than a predetermined level, for example, the strength of the radio wave (for example, the radio wave of the network 35) used for communication by the communication device 30 is strong enough to download the software used for the rewriting process from the software distribution server 500 smoothly. The rewriting processing unit 621 can determine whether the communication environment is equal to or higher than a predetermined level, for example, based on the detection result of the radio wave intensity sensor included in the vehicle sensor 14. Further, the communication environment of a predetermined level or higher may mean that the communication speed of a communicable (available) communication line (for example, network 35) is higher than a predetermined speed.

As such, in a situation where the software of the vehicle M can be smoothly downloaded from the software distribution server 500 and the rewriting process can be executed smoothly by executing the rewriting process when the communication environment in the parking lot PA is equal to or higher than a predetermined level, the software of the vehicle M can be rewritten by executing the rewriting process. On the other hand, in a situation where the communication environment in the parking lot PA is less than the predetermined level and the software of the vehicle M cannot be downloaded smoothly from the software distribution server 500, and thus the rewriting process is expected to take a long time, it is possible to prevent the rewriting process from being executed.

Even when the communication environment in the parking lot PA is less than the predetermined level, when the download of the software used for the rewriting process is completed before the vehicle M is parked in the parking lot PA, it is considered that the rewriting process can be executed smoothly. Here, even when the communication environment in the parking lot PA, more specifically, the communication environment of the parking space PS in which the vehicle M performing the rewriting process is parked is less than a predetermined level, the rewriting processing unit 621 may execute the rewriting process when the download of the software used for the rewriting process is completed before it is parked there. As a result, the rewriting process can be executed even when the communication environment is less than a predetermined level, and thus the opportunity for rewriting the software of the vehicle M can be increased.

However, as described above, the parking lot PA is an automatic valet parking type parking lot, and from the viewpoint of effectively utilizing the parking lot PA, the parking lot management device 400 may appropriately change the parking position (that is, the parking space PS) of the vehicle parked in the parking lot PA. For example, when a special size or special type of vehicle enters the parking lot PA, although the currently available parking space PS cannot allow the special vehicle to be parked, it may be possible to park the special vehicle by moving another parked vehicle to another parking space PS. In such a case, the parking lot management device 400 moves (that is, changes the parking position) the parked vehicle to another parking space PS. Changing the parking position of the vehicle parked as such is also referred to as repacking below.

In addition, repacking may be performed in response to a request from a parked vehicle. For example, the parking lot PA may have a position (for example, parking space PS with a parking space ID "001" in FIG. 5) where the communication environment is equal to or higher than a predetermined level and a position (for example, parking space PS with a parking space ID "003" in FIG. 5) where the communication environment is below a predetermined level. Here, when the rewriting processing unit 621 executes the rewriting process, if the vehicle M is parked at a position where the communication environment is less than a predetermined level, the rewriting processing unit 621 may request the parking lot management device 400 via the communication unit 630 to guide (lead) the vehicle M to the position where the communication environment is equal to or higher than a predetermined level. Here, the parking lot management device 400 performs reparking to move the vehicle M to the position where the communication environment is equal to or higher than a predetermined level in response to a request from the vehicle M. As a result, the vehicle M subjected to rewriting processing can be parked at an appropriate position for the rewriting process, and thus the opportunity to perform the rewriting process can be increased.

Also, from the viewpoint of parking the vehicle M which performs the rewriting process at an appropriate position for the rewriting process, the rewriting processing unit 621 may request the parking lot management device 400 via the communication unit 630 to guide (lead) the vehicle M to a position where an energy source is supplied when executing the rewriting process. As a result, it is possible to supply the energy source to the vehicle M and perform the rewriting process, and thus it is possible to prevent a situation in which the energy source of the vehicle M is exhausted and the software cannot be rewritten normally during the rewriting process.

Further, as described above, the parking lot management device 400 appropriately gives instructions such as repacking to each vehicle parked in the parking lot PA. However, when the vehicle receiving the instruction from the parking lot management device 400 is rewriting the software, it may not be possible to communicate with the parking lot management device 400 or it may not be possible to move according to the instruction from the parking lot management device 400. In such a case, based on the existence of a vehicle which cannot communicate with the parking lot management device 400 or does not move in response to the instruction from the parking lot management device 400, the parking lot management device 400 may detect an error (that is, a failure in the parking lot PA).

In order to prevent such false error detection of the parking lot management device 400, when the rewriting processing unit 621 executes the rewriting process, it is desirable to notify the parking lot management device 400 that the rewriting process is to be executed via the communication unit 630. As a result, the parking lot management device 400 can be notified in advance that the rewriting process will be executed. Therefore, for example, even when the vehicle M cannot communicate with the parking lot management device 400 or move due to the execution of the rewriting process, it is possible to prevent the parking lot management device 400 from detecting an error based thereon.

When the rewriting processing unit 621 completes the rewriting process, it is desirable to notify the parking lot management device 400 that the rewriting processing is completed via the communication unit 630. As a result, the parking lot management device 400 can be notified that the rewriting process has been completed. Therefore, for example, after receiving the notification, the parking lot management device 400 can effectively utilize the parking lot PA by treating the vehicle M that has been subjected to the rewriting process in the same manner as other vehicles and performing repacking or the like as appropriate.

Further, when the rewriting processing unit 621 executes the rewriting process, the rewriting processing unit 621 may notify the user's terminal device 300 that the rewriting process is to be executed via the communication unit 630. As a result, the user can be notified in advance that the rewriting process will be executed. Therefore, for example, the user can act after knowing that the vehicle M cannot be used for a while, which improves the convenience of the user.

Further, when the rewriting processing is completed, the rewriting processing unit 621 may notify the user's terminal device 300 that the rewriting processing is completed via the communication unit 630. As a result, the user can be notified that the rewriting process is completed. As a result, for example, the user can act after knowing that the vehicle M has become available, which improves the convenience of the user.

In addition, when the software of the vehicle M is rewritten by the rewriting process, it is desirable to verify whether the rewritten software operates the vehicle M normally from the viewpoint of ensuring the safety and convenience of the user.

Therefore, the processing unit 620 includes, for example, a verification processing unit 622 which causes the vehicle M to perform a test operation using the software rewritten by the rewriting process. Specifically, the verification processing unit 622 causes the vehicle M to perform the test operation using the software rewritten by the rewriting process in the parking lot PA after the rewriting process by the rewriting processing unit 621.

The verification processing unit 622, for example, causes the vehicle M which has been subjected to the rewriting process to temporarily exit the parking space PS where the vehicle M is parked and perform the test operation of parking the vehicle M in the parked space PS again. That is, the test operation includes an operation of moving the vehicle M which has been subjected to the rewriting process from the parking space PS. It is possible to verify whether the vehicle M which has been subjected to the rewriting process can be moved from the parking space PS. Further, the test operation includes an operation of stopping the vehicle M which has been subjected to the rewriting process in the parking space PS. It is possible to verify whether the vehicle M which has been subjected to the rewriting process can be stopped in the parking space PS. By such a test operation, it is possible to verify whether the vehicle M which has been subjected to the rewriting process can correctly park in the predetermined parking space PS even after the rewriting process.

The verification processing unit 622 determines that the test operation result is good (that is, there is no problem even when the rewritten software is enabled) when the vehicle M can be parked to the parking space PS where the vehicle M has been parked correctly again. Then, the verification processing unit 622 enables the rewritten software based on the determination that the test operation result is good as such. As a result, the safety and convenience of the user can be ensured.

On the other hand, when the vehicle M cannot be parked to the parking space PS where the vehicle M has been parked correctly (for example, when the parking position is displaced), the verification processing unit 622 determines that the test operation result is defective (that is, enabling the rewritten software can cause problems). As a result, it is possible to prevent the vehicle M from enabling the software that may reduce the safety and convenience of the user.

Further, the software rewriting device 60 may allow a user to perform an operation such as enabling the rewritten software when the operation result of the test operation is good. Specifically, here, the software rewriting device 60 sends a notification to the terminal device 300 that the operation result of the test operation is good and notifies the user, and the software rewriting device 60 causes the user to perform an operation such as enabling the software rewritten by using the input and output device 310. Then, the software rewriting device 60 enables the rewritten software when the user performs an operation to enable the rewritten software. As a result, the software rewritten with the user's permission can be enabled, and thus it is possible to prevent the user from feeling distrust or discomfort by enabling the software without permission.

In addition, after rewriting the software, it may take a certain period of time for the operation of the vehicle M to stabilize. Therefore, the software rewriting device 60 may enable the rewritten software after the vehicle M exits from the parking lot PA when the user performs the operation to enable the rewritten software. For example, when the software is rewritten, the vehicle M may learn using the rewritten software through running (for example, running to got out of the parking space PS where the vehicle M is parked) in the parking lot PA. Therefore, by enabling the rewritten software after the running (that is, learning) in the parking lot PA is completed and the vehicle M exits the parking lot PA, the rewritten software can be enabled after the operation of the vehicle M becomes stable.

The verification processing unit 622 may be made to perform the test operation when no person is on the vehicle M. Here, the verification processing unit 622 performs the test operation when, for example, there is no key of the vehicle M in the vehicle or when it is recognized that no person is on the vehicle M based on the captured image of the camera taking the inside of the vehicle. As a result, the test operation can be performed while ensuring the safely of the user.

Next, an example of the functional configuration of the parking lot management device 400 will be described with reference to FIG. 4. As described above, when the vehicle M which intends to perform the rewriting process in the parking lot PA is parked in an appropriate parking position for performing the rewriting process, for example, a parking position where the communication environment is equal to or higher than a predetermined level, the possibility that the rewriting process can be performed in the parking lot PA increases. Therefore, the parking lot management device 400 makes the vehicle M which intends to perform the rewriting process in the parking lot PA park at an appropriate parking position.

Figures 4, 5:
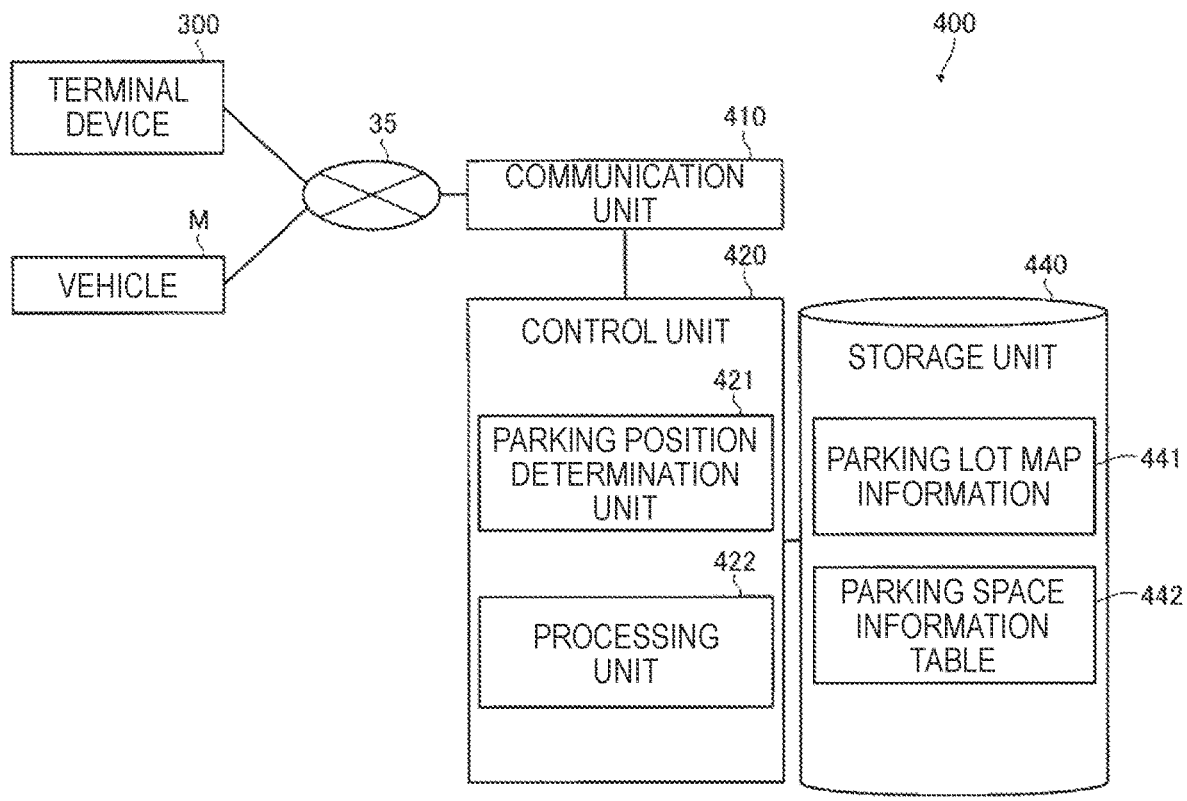
FIG. 4 is a diagram illustrating an example of a functional configuration of the parking lot management device.
FIG. 5 is a diagram illustrating an example of a parking space information table.

More specifically, as illustrated in FIG. 4, the parking lot management device 400 includes a communication unit 410, a control unit 420, and a storage unit 440. The communication unit 410 and the control unit 420 of the parking lot management device 400 are realized, for example, by the central processing unit (CPU) executing a predetermined program (software) stored in advance. A part or all of the functional parts may be realized by hardware such as large scale integration (LSI), application specific integrated circuit (ASIC), field-programmable gate array (FPGA), and graphics processing unit (GPU) or may be realized by the collaboration of software and hardware.

Further, the storage unit 440 is realized by various storage devices such as HDD and flash memory and stores various kinds of information such as parking lot map information 441 and the parking space information table 442, for example. The parking lot map information 441 is information which geometrically represents the structure of the parking lot PA and includes, for example, information indicating the coordinates (positions) of the respective parking spaces PS provided in the parking lot PA.

The parking space information table 442 stores information indicating the type and parking status of each parking space PS provided in the parking lot PA. More specifically, as illustrated in FIG. 5, in the parking space information table 442, for example, for the parking space ID, which is the identification information of the parking space PS, information indicating the type of the parking space PS identified by the parking space ID and parking information indicating the parking status of the parking space PS identified by the parking space ID are stored in association with each other.

In the parking space information table 442, the information indicating the type of the parking space PS includes, for example, information indicating whether the energy source can be supplied and information indicating the communication environment. The parking space PS in which the information of "possible" is stored as the information indicating whether the energy source can be supplied is a parking space PS which can supply the vehicle M with the energy source used when the vehicle M operates. For example, when the vehicle M is an electric vehicle, the parking space PS in which the information of "possible" is stored as the information indicating whether the energy source can be supplied is a parking space PS equipped with equipment capable of supplying electric power to the vehicle M. On the other hand, the parking space PS in which information of "not possible" is stored as the information indicating whether the energy source can be supplied is a parking space PS which does not have equipment (for example, equipment which can supply electric power) capable of supplying the energy source to the vehicle M.

The parking space PS in which information of "strong" is stored as information indicating the communication environment is a parking space PS in which the communication environment between the vehicle M and the software distribution server 500 is equal to or higher than a predetermined level. For example, the parking space PS in which information of "strong" is stored as the information indicating the communication environment is a parking space PS in which the intensity of the radio wave used for the network 35 is strong enough that the vehicle M (software rewriting device 60) can smoothly download the software from the software distribution server 500. On the other hand, the parking space PS in which information of "weak" is stored as the information indicating the communication environment is a parking space PS in which the intensity of the radio waves used for the network 35 is weak and it is difficult for the vehicle M (software rewriting device 60) to smoothly download the software from the software distribution server 500. Although an example in which the intensity of radio waves is set as the communication environment is described here, the invention is not limited thereto. The communication environment may be determined based on, for example, the communication speed of a communication line capable of communicating (available) at the location.

In the parking space information table 442, the parking information includes, for example, information indicating whether there is a parked vehicle in each corresponding parking space PS and information indicating the parked vehicle. As the information indicating whether there is a parked vehicle, for example, "full" indicating that there is a parked vehicle or "empty" indicating that there is no parked vehicle is stored. As the information indicating the parked vehicle, the information indicating the vehicle ID which identifies the vehicle parked in the parking space PS.

The communication unit 410 communicates with the vehicle M using a wireless manner (for example, network 35). The communication unit 410 may also communicate with the terminal device 300 of the user. The control unit 420 determines the parking position of the vehicle M based on the information acquired through the communication unit 410 and the information stored in the storage unit 440 and guides the vehicle M to the determined parking position.

Specifically, the control unit 420 includes a parking position determination unit 421 and a processing unit 422. The parking position determination unit 421 determines the parking position of the vehicle M based on whether the vehicle M rewrites the software in the parking lot PA. That is, the parking position determination unit 421 can make the parking position different depending on whether the vehicle M rewrites the software in the parking lot PA or does not rewrite the software.

For example, as will be described below, the vehicle M transmits vehicle information regarding the vehicle M to the parking lot management device 400 when entering the parking lot PA. The vehicle information includes information indicating whether to execute the rewriting process in the parking lot PA. As a result, the vehicle M can notify the parking lot management device 400 whether to execute the rewriting process in the parking lot PA.

Then, when the vehicle M notifies that the rewriting process is to be executed, that is, when the vehicle information indicating that the rewriting process is to be executed is received by the communication unit 410, the parking position determination unit 421 determines the parking position of the vehicle M to a parking space PS in which the communication environment between the vehicle M and the software distribution server 500 is equal to or higher than a predetermined level.

Specifically, by referring to the parking space information table 442, the parking position determination unit 421 determines the parking space PS in which the information indicating the communication environment is "strong" and the parking information is "empty" as the parking position of the vehicle M in which the rewriting process is to be performed. As a result, it is possible to stop the vehicle M which performs the rewriting process in the parking space PS whose communication environment is equal to or higher than a predetermined level, and thus the possibility that the vehicle M can perform the rewriting process can be increased.

Further, when the energy source of the vehicle M is exhausted during the rewriting process and the execution of the rewriting process is interrupted, the software cannot be normally rewritten by the rewriting process. Therefore, for the vehicle M in which the rewriting process is to be performed, it is desirable to stop the vehicle M at a parking position where the energy source can be supplied and to perform the rewriting process while supplying the energy source.

Therefore, when there is a notification from vehicle M that the rewriting process is executed, that is, when vehicle information indicating that the rewriting process is executed is received by the communication unit 410, the parking position determination unit 421 determines the parking position of the vehicle M to a parking space PS capable of supplying an energy source to the vehicle M.

Specifically, by referring to the parking space information table 442, the parking position determination unit 421 determines the parking space PS in which the information indicating whether the energy source can be supplied is "possible" and the parking information is "empty" as the parking position of the vehicle M in which the rewriting process is to be performed. As a result, the vehicle M which performs the rewriting process can be stopped in the parking space PS capable of supplying the energy source, and thus the possibility that the vehicle M can perform the rewriting process can be increased.

In addition, another vehicle (for example, another vehicle which performs the rewriting process) may be parked in the parking space PS that is suitable for the rewriting process, such as the parking space PS where the communication environment between the vehicle M and the software distribution server 500 is equal to or higher than a predetermined level and the parking space PS that can supply the energy source to the vehicle M. In such a case, the parking position determination unit 421 determines, for example, the parking position of the vehicle M which has notified that the rewriting process is to be executed to another parking space PS that is available at that time. Therefore, even when another vehicle is parked in the parking space PS suitable for the rewriting process, the vehicle M which has notified that the rewriting process is to be executed can enter the parking lot PA.

However, when the parking position of the vehicle M which has notified that the rewriting process is to be executed is determined to be another parking space PS (parking space PS that is not suitable for the rewriting process) that is available at that time, the parking lot management device 400 restricts the vehicle M from performing the rewriting process by instructing the vehicle M not to perform the rewriting process. As a result, it is possible to prevent rewriting processing that may not be completed normally.

Also, when another vehicle parked in the parking space PS suitable for the rewriting process moves from that parking space PS, the parking lot management device 400 may move the vehicle M which has notified that the rewriting process is to be executed to the parking space PS and allow the rewriting process to be performed. As a result, the vehicle M which has notified that the rewriting process is to be executed can be moved to the parking space PS suitable for performing the rewriting process that has become empty and the rewriting process can be appropriately performed.

Also, as described above, when the vehicle M, which performs the rewriting process, has downloaded the software used for the rewriting process before entering the parking lot PA, the rewriting process can be performed stably regardless of the communication environment of the parking position in the parking lot PA. Therefore, there is little need to allocate a parking space PS with a good communication environment to such a vehicle M, and rather, from the viewpoint of effectively utilizing the parking lot PA, it may be better to allocate the parking space PS, which has a poor communication environment, to such a vehicle M.

Therefore, for example, vehicle information including information indicating whether the software used for the rewriting process has been downloaded is transmitted to the parking lot management device 400, such that the vehicle M notifies the parking lot management device 400 whether the software used for the rewriting process has been downloaded. Here, when the vehicle M notifies that the software used for the rewriting process has been downloaded, the parking position determination unit 421 determines the parking position of the vehicle M to a parking space PS in which the communication environment between the vehicle M and the software distribution server 500 is less than a predetermined level.

Specifically, by referring to the parking space information table 442, the parking position determination unit 421 determines the parking space PS in which the information indicating the communication environment is "weak" and the parking information is "empty" as the parking position of the vehicle M in which the rewriting process is to be performed. As a result, the limited parking space PS whose communication environment is equal to or higher than a predetermined level can be assigned to other vehicles for which the software used for the rewriting process has not been downloaded, and thus the parking lot PA can be effectively utilized.

Further, when the remaining energy amount of the vehicle M in which the rewriting process is to be performed is sufficient, it is less necessary to allocate a parking space PS capable of supplying the energy source to such a vehicle M, and rather, from the viewpoint of effectively utilizing the parking lot PA, it may be better to allocate a parking space PS where the energy source cannot be supplied to such a vehicle M.

Therefore, for example, the vehicle M transmits vehicle information including information indicating the remaining energy amount to the parking lot management device 400, such that the vehicle M notifies the parking lot management device 400 of the remaining energy amount. Here, when the remaining energy amount of the vehicle M in which the rewriting process is to be performed is equal to or more than a predetermined amount, the parking position determination unit 421 determines the parking position of the vehicle M to the parking space PS where the energy source cannot be supplied.

Specifically, by referring to the parking space information table 442, the parking position determination unit 421 determines the parking space PS in which the information indicating whether the energy source can be supplied is "not possible" and the parking information is "empty" as the parking position of the vehicle M in which the rewriting process is to be performed. As a result, the limited parking space PS capable of supplying the energy source can be allocated to other vehicles having less than a predetermined amount of energy remaining, and thus the parking lot PA can be effectively utilized.

The processing unit 422 acquires the position of the parking space PS where each vehicle M should be parked in the parking lot PA from the parking lot map information 441, and then the processing unit 422 transmits a suitable route to the position of the acquired parking space PS to the vehicle M via the communication unit 410. In the vehicle M which received the route, the action plan generation unit 130 generates a target track based on the received route and the action control unit 140 controls the vehicle M to act according to the action plan generated by the action plan generation unit 130. As a result, the vehicle M is guided to the parking space PS determined by the parking lot management device 400 and parked in the parking space PS.

However, as an automatic valet parking type parking lot such as the parking lot PA, a plurality of types of parking lots in which the automatic driving performance required for a vehicle for parking is different can be considered. As a first type of automatic valet parking type parking lot, for example, a parking lot in which a parking lot management device which manages the parking lot determines a parking position and a route to the parking position and guides the vehicle to the parking position by the route can be considered.

In addition, as the second type of automatic valet parking type parking lot, for example, a parking lot in which a parking lot management device which manages the parking lot determines only the parking position and a vehicle autonomously determines a route to the parking position and moves to the parking position by the route can be considered. In order to park the vehicle M in such a second type of automatic valet parking type parking lot, the vehicle is required to have higher automatic driving performance than in the case of the first type of automatic valet parking type parking lot. Specifically, a function of determining a route to a parking position and autonomously moving to the parking position by the route is required.

Therefore, for example, a vehicle which can move to the parking position by the route determined by the parking lot management device but cannot determine the route to the parking position and autonomously move to the parking position by the route can be parked in the first type of automatic valet parking type parking lot, but not in the second type of automatic valet parking type parking lot. As such, the parking lot where the vehicle M can be parked may differ depending on the automatic driving performance of the vehicle.

However, when the software of the vehicle M is rewritten, new functions (for example, a function of determining a route to a parking position and autonomously moving to the parking position by the route) may be added to the vehicle M, whereby the automatic driving performance of the vehicle M may be improved. When the automatic driving performance of the vehicle M is improved, the number of parking lots where the vehicle M can be parked may increase. Therefore, from the viewpoint of improving the commercial value of the vehicle M and the convenience of a user, it is desired to prompt the rewriting of the software of the vehicle M.

Therefore, in the embodiment, the navigation device 40 functions as a notification device for notifying the parking lot in which the vehicle M can be parked and the notification prompts the user to rewrite the software of the vehicle M.

As illustrated in FIG. 1, the navigation device 40 includes the first performance acquisition unit 44, the second performance acquisition unit 45, and the processing unit 46. The first performance acquisition unit 44 acquires information indicating the current performance of the vehicle M. The first performance acquisition unit 44 acquires, for example, information indicating the current automatic driving performance of the vehicle M from the automatic driving control device 100 or the like. The information indicating the automatic driving performance can be information indicating the type of parking lot in which the vehicle M can be parked, such as the above-described "first type" and "second type". Information indicating the current automatic driving performance of the vehicle M is preset in the automatic driving control device 100 and the automatic driving control device 100 sends the information indicating the current automatic driving performance of the set vehicle M to the navigation device 40 in response to a request from the navigation device 40.

The second performance acquisition unit 45 acquires information indicating the changed performance of the vehicle M, which changes by rewriting the software of the vehicle M. The second performance acquisition unit 45 acquires, for example, information indicating the automatic driving performance after the change of the vehicle M, which changes by rewriting the software of the vehicle M, from the software distribution server 500 or the like. In the software distribution server 500, information indicating the automatic driving performance after rewriting to the software is preset together with the software of the vehicle M and the software distribution server 500 sends information indicating the automatic driving performance after set rewriting to the navigation device 40 in response to a request from the navigation device 40.

The processing unit 46 includes the notification unit 47. The notification unit 47 notifies the parking lot in which the vehicle M can be parked based on the information indicating the current performance acquired by the first performance acquisition unit 44 and the information indicating the changed performance acquired by the second performance acquisition unit 45. Specifically, the notification unit 47 separately notifies the parking lot where the vehicle M can be parked by the current automatic driving performance of the vehicle M and the parking lot where the vehicle M can be parked by the changed automatic driving performance. As a result, it is possible to notify a user of how the parking lot where the vehicle M can be parked changes by rewriting the software of the vehicle M, such that it is possible to prompt the rewriting of the software of the vehicle M. An example of separately notifying the parking lot where the vehicle M can be parked by the current automatic driving performance of the vehicle M and the parking lot where the vehicle M can be parked by the changed automatic driving performance after will be described below with reference to FIG. 12.

Further, the notification unit 47 may perform the above notification, for example, when a user performs an operation of searching for a parking lot in which the vehicle M can be parked. As a result, the above notification can be performed at the time when a user is interested in the parking lot in which the vehicle M can be parked. That is, the above notification can be effectively performed and the rewriting of the software of the vehicle M can be prompted.

Also, for example, the software may be rewritten when the vehicle M is parked in the first type parking lot, and as a result, the vehicle M may be parked in the second type parking lot. The second type parking lot is, in other words, a parking lot in which the vehicle M performs the above-described driving tasks more than in the case of the first type parking lot. Then, from the viewpoint of user convenience, it may be preferable that the vehicle M be parked in the second type parking lot.

Therefore, when rewriting the software when the vehicle M is parked in the first type parking lot, after rewriting the software, the processing unit 46 may perform an operation as to whether to move the vehicle M to a parking lot where the vehicle M can be parked by the changed performance. Further, when a user accepts an operation to move to the parking lot where the vehicle M can be parked by the changed performance, after rewriting the software, the vehicle M moves to the parking lot where the vehicle M can be parked by the changed performance, autonomously or in cooperation with the parking lot management device of the parking lot to which the vehicle is moved. As a result, the convenience of the user can be improved.

In addition, the software of the vehicle M may have a validity period set. Therefore, when rewriting the software, the processing unit 46 may allow a user to perform an operation of setting the validity period of the software to the first period (for example, one day) or the second period (for example, one year) longer than the first period. When the operation to set the validity period of the software to the first period is accepted, the vehicle M sets the validity period of the rewritten software to the first period. On the other hand, when the operation to set the validity period of the software to the second period is accepted, the vehicle M sets the validity period of the rewritten software to the second period. As a result, the validity period can be set as desired by the user, and thus the convenience of the user can be improved.

Process Performed by Software Rewriting Device
Rewriting Reservation Process

Next, an example of the process performed by the software rewriting device 60 will be described. First, a rewriting reservation process performed by the software rewriting device 60 will be described with reference to FIG. 6. The software rewriting device 60, for example, performs the rewriting reservation process illustrated in FIG. 6 at a predetermined cycle.

Figure 6:
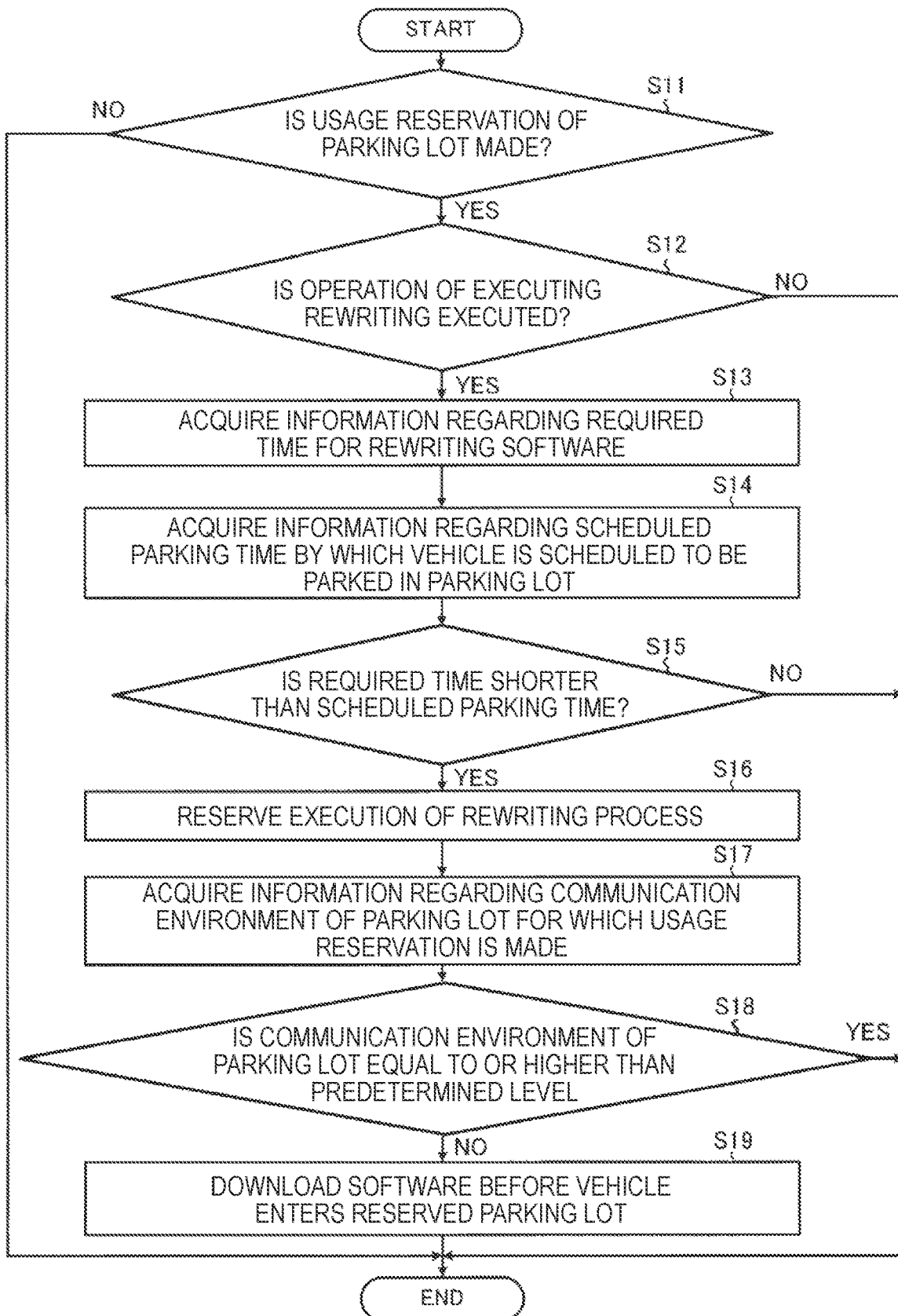
FIG. 6 is a diagram illustrating an example of a functional configuration of a navigation device.

As illustrated in FIG. 6, in the rewriting reservation process, the software rewriting device 60 determines whether the parking lot PA usage reservation has been made (Step S11). When it is determined that the parking lot PA usage reservation has not been made (NO in Step S11), the software rewriting device 60 ends the rewriting reservation process illustrated in FIG. 6 as it is.

When it is determined that the parking lot PA usage reservation has been made (YES in Step S11), the software rewriting device 60 determines whether an operation to execute the rewriting process has been performed at the time of the usage reservation (Step S12). When it is determined that the operation to execute the rewriting process has not been performed (NO in Step S12), the software rewriting device 60 ends the rewriting reservation process illustrated in FIG. 6 as it is.

When it is determined that the operation to execute the rewriting process has been performed (YES in Step S12), the software rewriting device 60 acquires information indicating the time required to rewrite the software by the rewriting process (Step S13). Next, the software rewriting device 60 acquires information indicating the scheduled parking time by which the vehicle is scheduled to be parked in the parking lot PA for which the usage reservation has been made (Step S14).

Then, the software rewriting device 60 determines whether the required time is shorter than the scheduled parking time based on the information indicating the required time acquired in Step S13 and the information indicating the scheduled parking time acquired in Step S14 (Step S15). When it is determined that the required time is longer than the scheduled parking time (NO in Step S15), the software rewriting device 60 ends the rewriting reservation process illustrated in FIG. 6 as it is.

When it is determined that the required time is shorter than the scheduled parking time (YES in Step S15), the software rewriting device 60 reserves the execution of the rewriting process so that the rewriting process is executed when the vehicle M is parked in the parking lot PA for which the usage reservation has been made (Step S16). In Step S16, the software rewriting device 60 stores, for example, information indicating that the rewriting process is executed when the vehicle M enters the parking lot PA based on the usage reservation in a storage device (not illustrated) provided in the own device.

Next, the software rewriting device 60 acquires information indicating the communication environment of the parking lot PA for which the usage reservation has been made (Step S17). For example, the first map information 43 stored in the navigation device 40 includes information indicating the communication environment of each parking lot. Then, in Step S17, the software rewriting device 60 acquires information indicating the communication environment of the parking lot PA from the navigation device 40. Further, the software rewriting device 60 may acquire the information indicating the communication environment of the parking lot PA from the parking lot management device 400 via the communication device 30 or the like.

Next, the software rewriting device 60 determines whether the communication environment of the parking lot PA is equal to or higher than a predetermined level based on the information indicating the communication environment acquired in Step S17 (Step S18). Then, when it is determined that the communication environment of the parking lot PA is equal to or higher than a predetermined level (YES in Step S18), the software rewriting device 60 ends the rewriting reservation process illustrated in FIG. 6 as it is.

On the other hand, when it is determined that the communication environment of the parking lot PA is less than the predetermined level (NO in Step S18), the software rewriting device 60 downloads the software used for the rewriting process from the software distribution server 500 before the vehicle M enters the parking lot PA based on the usage reservation (Step S19), and then the rewriting reservation process illustrated in FIG. 6 is ended. For example, when the software used for the rewriting process is downloaded from the software distribution server 500, the software rewriting device 60 stores the downloaded software in a storage device or the like provided in the own device in association with the information indicating that the rewriting process stored in Step S16 is to be executed.

Rewriting Execution Process

Next, a rewriting execution process performed by the software rewriting device 60 will be described with reference to FIG. 7. The software rewriting device 60, for example, performs the rewriting execution process illustrated in FIG. 7 at a predetermined cycle.

Figure 7:
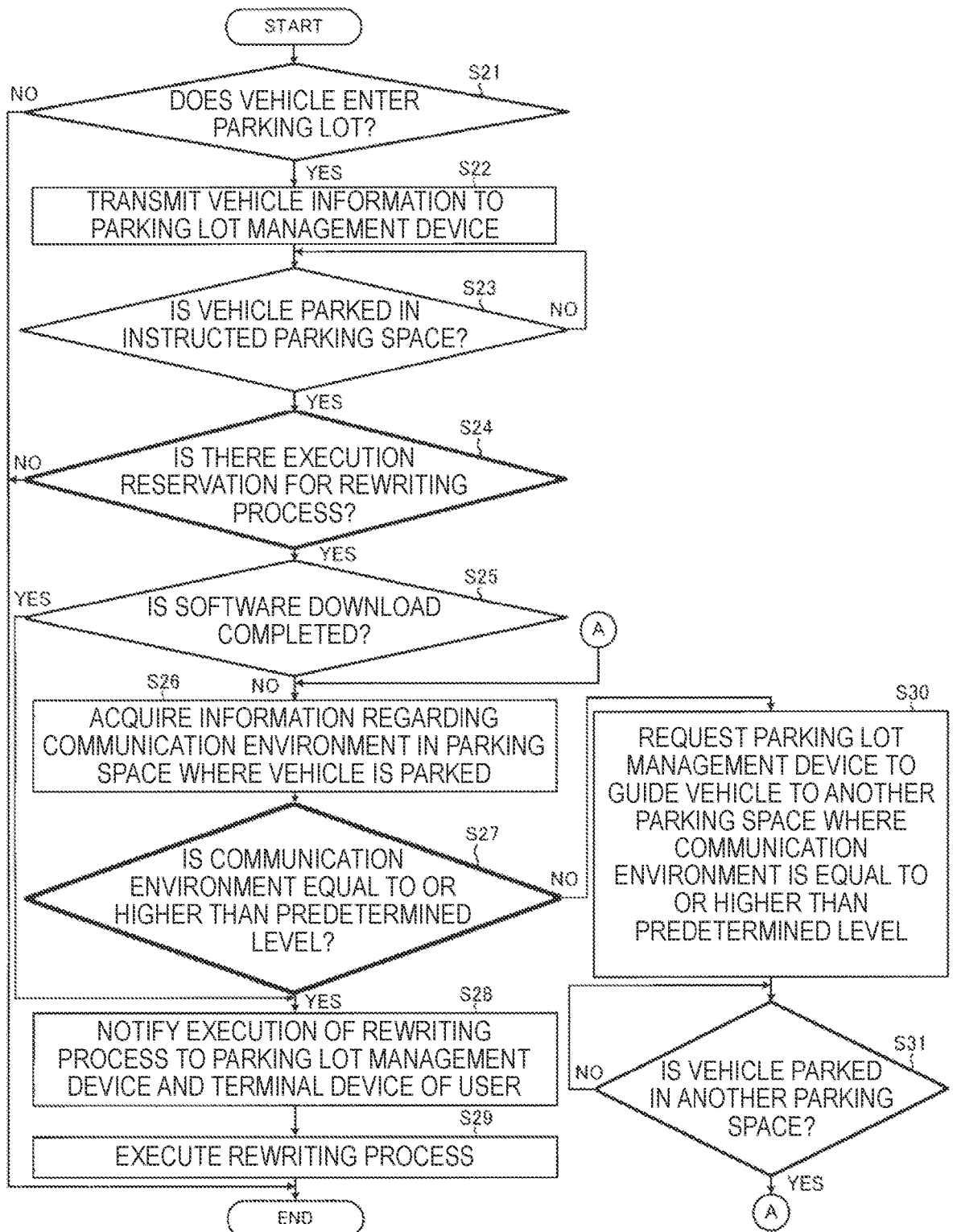
FIG. 7 is a flow chart illustrating an example of a rewriting reservation process performed by the software rewriting device.

As illustrated in FIG. 7, in the rewriting execution process, the software rewriting device 60 determines whether the vehicle M has entered the parking lot PA for which the usage reservation has been made (Step S21). When it is determined that the vehicle M has not entered the parking lot PA for which the usage reservation has been made (NO in Step S21), the software rewriting device 60 ends the rewriting execution process illustrated in FIG. 7 as it is.

When it is determined that the vehicle M has entered the parking lot PA for which the usage reservation has been made (YES in Step S21), the software rewriting device 60 transmits vehicle information regarding the vehicle M to the parking lot management device 400 of the parking lot PA where the vehicle M has entered (Step S22). The vehicle information includes, for example, information indicating whether to execute the rewriting process in the parking lot PA, whether the software used for the rewriting process has been downloaded when the rewriting process is executed, the remaining energy amount of the vehicle M, and the like.

Therefore, by sending the vehicle information to the parking lot management device 400, the software rewriting device 60 can notify the parking lot management device 400 of whether to execute the rewriting process in the parking lot PA, whether the software used for the rewriting process has been downloaded when the rewriting process is executed, the remaining energy amount of the vehicle M, and the like.

Next, the software rewriting device 60 determines whether the vehicle M is parked in the parking space PS instructed by the parking lot management device 400 (Step S23). When the vehicle M is not parked in the parking space PS (NO in Step S23), the software rewriting device 60 waits until the vehicle M is parked.

Then, when the vehicle M is parked in the parking space PS instructed by the parking lot management device 400 (YES in Step S23), the software rewriting device 60 determines whether there is an execution reservation to execute the rewriting process in the parking lot PA (Step S24). When it is determined that there is no execution reservation for the rewriting process (NO in Step S24), the software rewriting device 60 ends the rewriting execution process illustrated in FIG. 7 as it is.

When it is determined that there is an execution reservation for the revolting process (YES in Step S24), the software rewriting device 60 determines whether the software used for the rewriting process has been downloaded (Step S25). When it is determined that the software used for the rewriting process has been downloaded (YES in Step S25), the software rewriting device 60 shifts to the process in Step S28.

On the other hand, when it is determined that the software used for the rewriting process has not been downloaded (NO in Step S25), the software rewriting device 60 acquires information indicating the communication environment in the parking space PS in which the vehicle M is parked (Step S26). Then, the software rewriting device 60 determines whether the communication environment in the parking space PS in which the vehicle M is parked is equal to or higher than the predetermined level based on the information indicating the communication environment acquired in Step S26 (Step S27).

When it is determined that the communication environment in the parked space PS where the vehicle M is parked is equal to or higher than the predetermined level (YES in Step S27), the software rewriting device 60 notifies the parking lot management device 400 and the user's terminal device 300 that the rewriting process is to be executed (Step S28), executes the rewriting process (Step S29), and ends the rewriting execution process illustrated in FIG. 7.

On the other hand, when it is determined that the communication environment in the parked space PS in which the vehicle M is parked is less than the predetermined level (NO in Step S27), the software rewriting device 60 requests the parking lot management device 400 to guide the vehicle to another parking space PS where the communication environment is equal to or higher than the predetermined level (Step S30). Then, the software rewriting device 60 determines whether the vehicle M is parked in another parking space PS as a result of the request (Step S31).

When it is determined that the vehicle M is not parked in another parking space PS (NO in Step S31), the software rewriting device 60 waits until the vehicle M is parked in another parking space PS. Then, when it is determined that the vehicle M is parked in another parking space PS (YES in Step S31), the software rewriting device 60 shifts to the process of Step S26.

Post-Rewriting Process

Next, a post-rewriting process performed by the software rewriting device 60 will be described with reference to FIG. 8. For example, when the rewriting process is executed by the rewriting execution process illustrated in FIG. 7, the software rewriting device 60 performs the post-rewriting process illustrated in FIG. 8.

Figure 8:
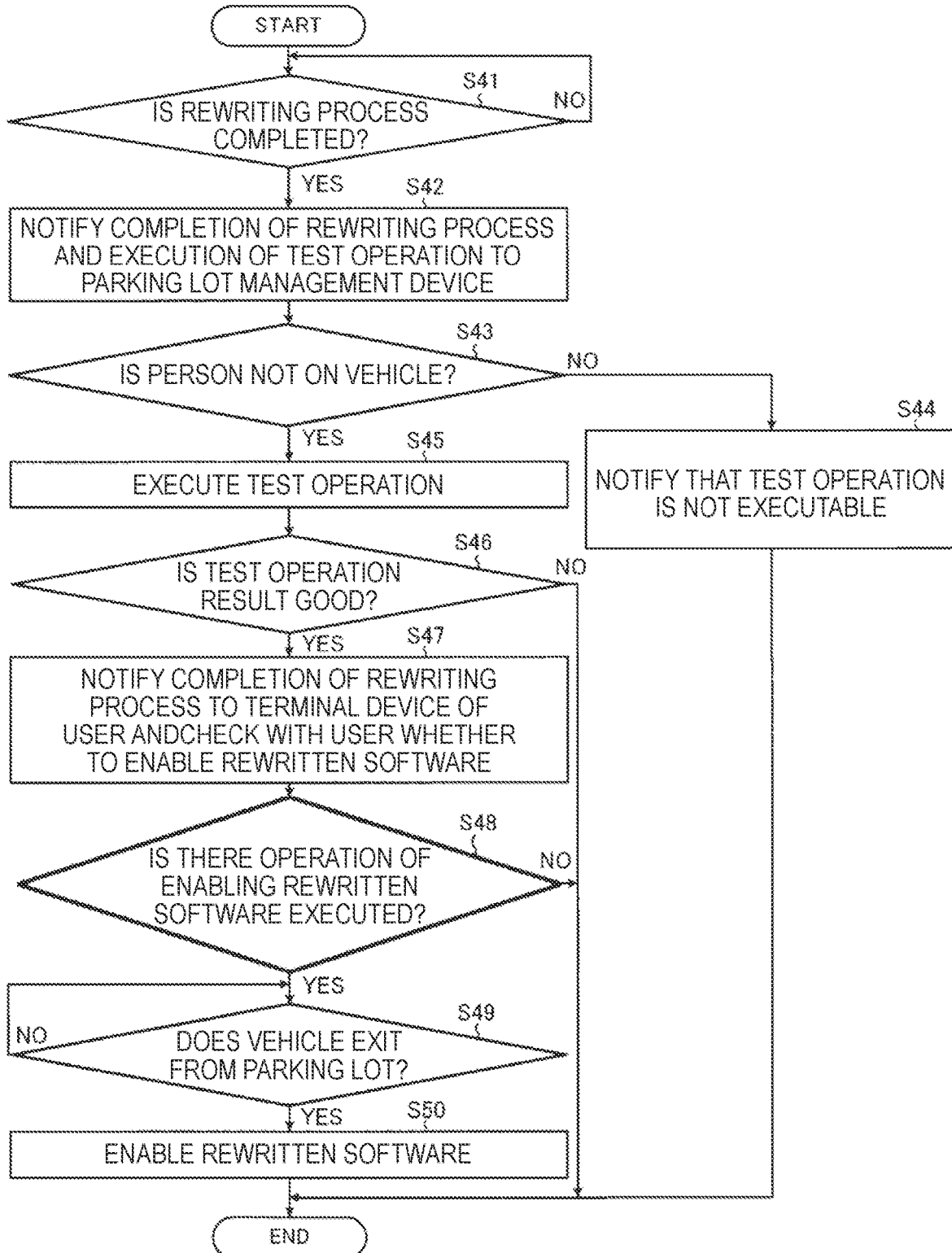
FIG. 8 is a flow chart illustrating an example of a rewriting execution process performed by the software rewriting device.

As illustrated in FIG. 8, in the post-rewriting process, the software rewriting device 60 determines whether the rewriting process is completed (Step S41). When the rewriting process is not completed (NO in Step S41), the software rewriting device 60 waits until the rewriting process is completed.

When the rewriting process is completed (YES in Step S41), the software rewriting device 60 notifies the parking lot management device 400 that the rewriting process is completed and that the test operation is to be executed (Step S42). The software rewriting device 60 may separately notify the parking lot management device 400 that the rewriting process is completed and that the test operation is to be executed. Next, the software rewriting device 60 determines whether a person is not on the vehicle M to be subjected to the test operation (Step S43).

When it is determined that a person is on the vehicle M (NO in Step S43), the software rewriting device 60 notifies the person on the vehicle M that the test operation cannot be executed via the input and output devices 20 and 42 or the like (Step S44) and ends the post-rewriting process illustrated in FIG. 8. When it is determined that no person is on the vehicle M (YES in Step S43), the software rewriting device 60 causes the vehicle M to execute the test operation (Step S45). In Step S45, as described above, the software rewriting device 60 causes the vehicle M to perform, for example, a test operation in which the vehicle M is temporarily moved from the parked parking space PS and then parked again in the parking space PS.

Next, the software rewriting device 60 determines whether the test operation result by the test operation executed in Step S45 is good (Step S46). When it is determined that the test operation result is defective (NO in Step S46), the software rewriting device 60 ends the post-rewriting process illustrated in FIG. 8 as it is. Here, since the process of Step S50, which will be described below, is not performed, the software (software that is likely to be the cause of the defective test operation result) rewritten by the rewriting process is not enabled.

On the other hand, when it is determined that the test operation result is good (YES in Step S46), the software rewriting device 60 notifies the user's terminal device 300 that the rewriting process is completed and confirms to the user whether to enable the software rewritten by the rewriting process (Step S47). Then, the software rewriting device 60 determines whether there is an operation to enable the rewritten software based on the information received from the terminal device 300 as a result of the process in Step S47 (Step S48).

When there is no operation to enable the rewritten software, that is, when there is an operation to not enable the rewritten software (NO in Step S48), the software rewriting device 60 ends the post-rewriting process illustrated in FIG. 8 as it is. That is, even here, since the process of Step S50 described below is not performed, the software rewritten by the rewrite process is not enabled. In addition, when there is an operation not to enable the rewritten software (that is, NO in Step S48), the software rewriting device 60 may ask a user whether to enable the rewritten software again at a predetermined time while the vehicle M is parked in the parking lot PA. Also, when the next usage reservation of the parking lot PA is made or when the vehicle M is parked in the parking lot PA next time based on the usage reservation, or the like, the software rewriting device 60 may ask a user whether to enable the rewritten software again. Then, as a result of reconfirming with the user whether to enable the rewritten software, when an operation to enable the rewritten software is performed, the software rewriting device 60 enables the rewritten software. Here, since the test operation and the like have already been performed, the software rewriting device 60 only needs to enable the rewritten software.

On the other hand, when there is an operation to enable the rewritten software (YES in Step S48), the software rewriting device 60 waits for the vehicle M to exit from the parking lot PA (NO in Step S49). Then, when the vehicle M exits the parking lot PA (YES in Step S49), the software rewriting device 60 enables the software rewritten by the rewriting process (Step S50) and ends the post-rewriting process illustrated in FIG. 8.

Process Performed by Parking Lot Management Device

Next, an example of the process performed by the parking lot management device 400 will be described. The parking lot management device 400, for example, performs a parking position determination process illustrated in FIG. 9 at a predetermined cycle.

Figure 9:
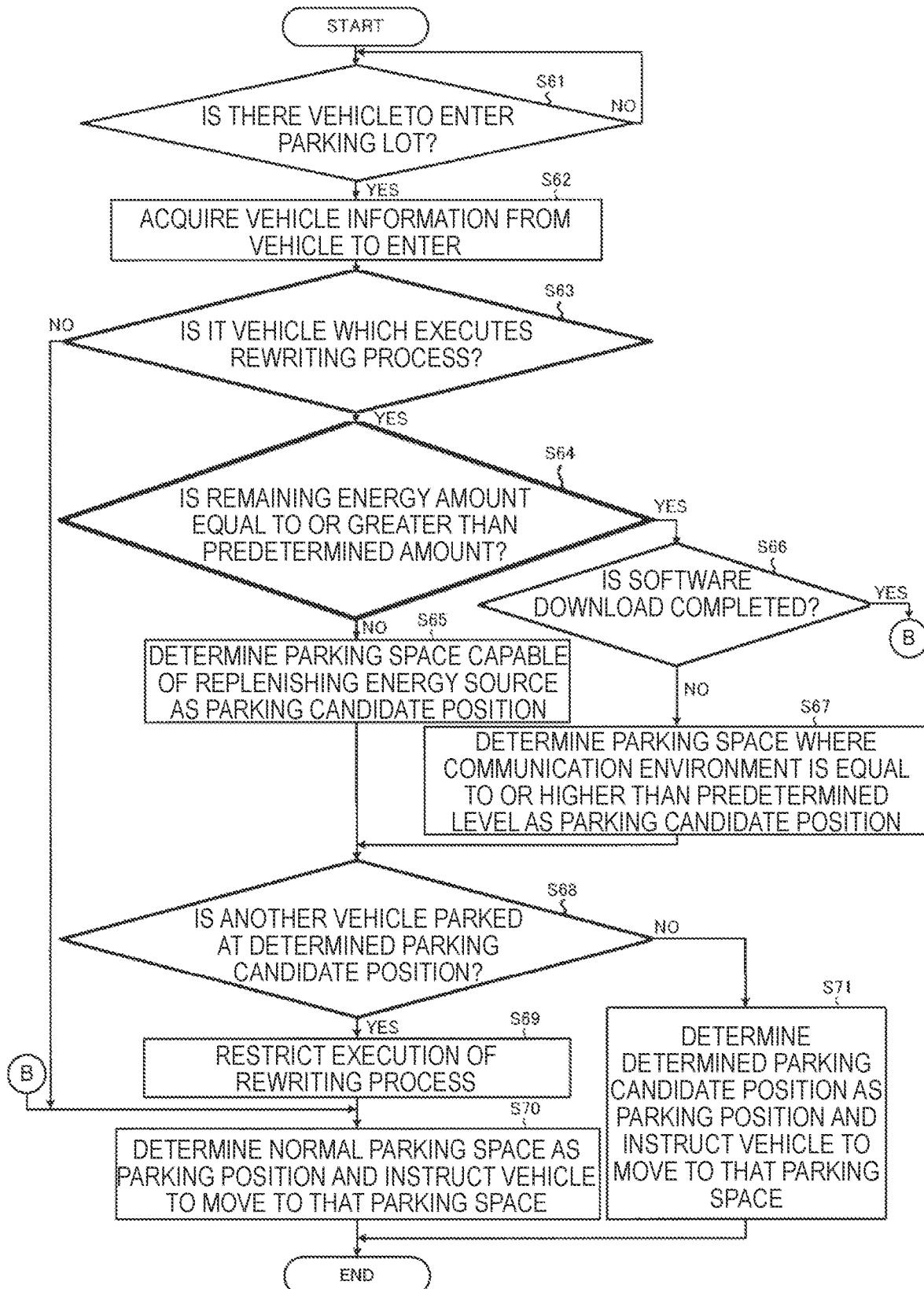
FIG. 9 is a flow chart illustrating an example of a post-rewriting process performed by the software rewriting device.

As illustrated in FIG. 9, in the parking position determination process, the parking lot management device 400 determines whether there is a vehicle to enter the parking lot PA (Step S61). When it is determined that there is no vehicle to enter the parking lot PA (NO in Step S61), the parking lot management device 400 repeats the process of Step S61.

When it is determined that there is a vehicle to enter the parking lot PA (YES in Step S61), the parking lot management device 400 acquires vehicle information from the vehicle to enter the parking lot PA (Step S62). As a result, the parking lot management device 400 can acquire information indicating whether to execute the rewriting process in the parking lot PA, Whether the software used for the rewriting process has been downloaded, the remaining energy amount, and the like for the vehicle to enter the parking lot PA.

Then, the parking lot management device 400 determines whether the vehicle to be entered is a vehicle which executes the rewriting process based on the vehicle information acquired in Step S62 (Step S63). When it is determined that the vehicle to be entered is a vehicle which does not execute the rewriting process (NO in Step S63), the parking lot management device 400 shifts to the process in Step S70.

When it is determined that the vehicle to be entered is a vehicle which executes the rewriting process (YES in Step S63), the parking lot management device 400 determines whether the remaining energy amount of the vehicle (that is, the vehicle which executes the rewriting process) to enter is equal to or greater than a predetermined amount based on the vehicle information acquired in Step S62 (Step S64).

When it is determined that the remaining energy amount of the vehicle to enter is less than the predetermined amount (NO in Step S64), the parking lot management device 400 determines a parking space PS (that is, parking space PS where the information indicating whether the energy source can be supplied is "possible") capable of supplying an energy source as a parking candidate position of the vehicle to enter (Step S65) and proceeds to the process of Step S68. In the embodiment, it is assumed that the parking space PS capable of supplying an energy source has a communication environment of a predetermined level or higher.

When it is determined that the remaining energy amount of the vehicle to enter is equal to or greater than the predetermined amount (YES in Step S64), the parking lot management device 400 determines whether the software used for the rewriting process has been downloaded by the vehicle to enter based on the vehicle information acquired in Step S62 (Step S66). When it is determined that the software used for the rewriting process has not been downloaded (NO in Step S66), the parking lot management device 400 determines a parking space PS (that is, parking space PS where the information indicating the communication environment is "strong") whose communication environment is equal to or higher than the predetermined level as a parking candidate position of the vehicle to enter (Step S67) and proceeds to the process of Step S68.

Next, the parking lot management device 400 determines whether another vehicle is parked at the parking candidate position determined by the process of Step S65 or Step S67 (Step S68). A plurality of parking spaces PS (parking space PS where the information indicating whether the energy source can be supplied is "possible") capable of supplying an energy source and parking spaces PS (parking space PS where the information indicating the communication environment is "strong") where the communication environment is equal to or higher than the predetermined level may be provided. Here, the parking lot management device 400 determines whether other vehicles are parked in all of the parking spaces PS of the type determined as parking candidate positions.

When it is determined that another vehicle is parked at the determined parking candidate position (YES in Step S68), the parking lot management device 400 cannot allocate a parking space PS suitable for performing the rewriting process to the vehicle to enter. Therefore, the execution of the rewriting process of the vehicle is restricted by instructing the vehicle not to execute the rewriting process (Step S69) and the process proceeds to the process of Step S70.

Next, the parking lot management device 400 determines a normal parking space PS as the parking position of the vehicle to enter. Then, the parking lot management device 400 instructs the vehicle to move to the parking space PS (Step S70) and ends the parking position determination process illustrated in FIG. 9. The normal parking space PS is, for example, a parking space PS in which the information indicating whether the energy source can be supplied is "not possible" and the information indicating the communication environment is "weak".

On the other hand, when it is determined that no other vehicle is parked at the determined parking candidate position (NO in Step S68), the parking lot management device 400 determines the determined parking candidate position (that is, the parking space PS suitable for performing the rewriting process) as the parking position of the vehicle to enter. Then, the parking lot management device 400 instructs the vehicle to move to the parking space PS (Step S71) and ends the parking position determination process illustrated in FIG. 9.

Here, an example is described in which the parking space PS capable of supplying an energy source has a communication environment of the predetermined level or higher, but the invention is not limited thereto. When the communication environment of the parking space PS capable of supplying the energy source is not equal to or higher than the predetermined level, first, the software may be downloaded in a place with a good communication environment, and then the vehicle may be moved (reparked) to the parking space PS capable of supplying the energy source.

Process Performed by Navigation Device

Parking Lot Search Process

Next, an example of a process performed by the navigation device 40 will be described. First, a parking lot search process performed by the navigation device 40 will be described with reference to FIG. 10. The navigation device 40 performs, for example, the parking lot search process illustrated in FIG. 10 at a predetermined cycle.

Figure 10:
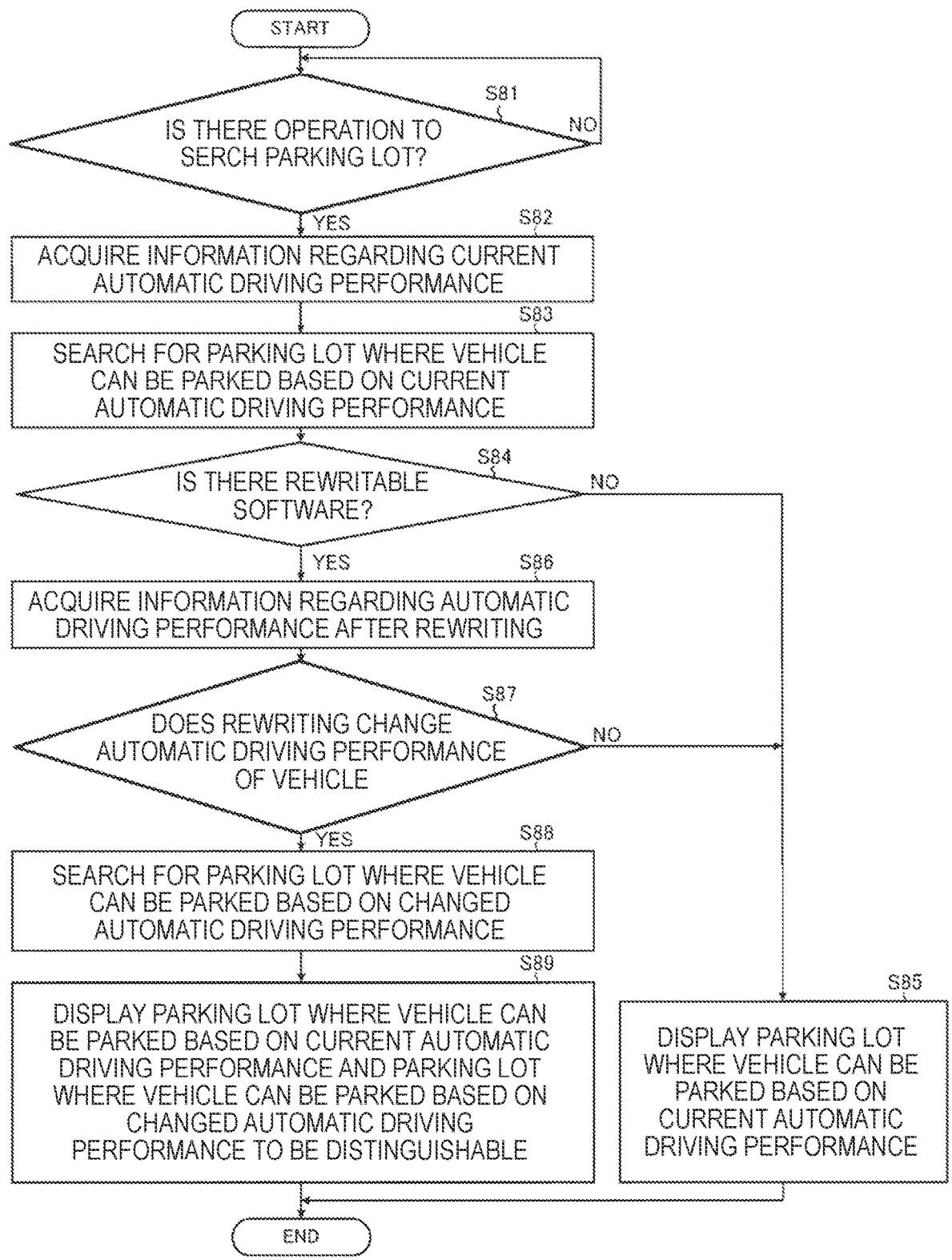
FIG. 10 is a flow chart illustrating an example of a parking position determination process performed by the parking lot management device.

As illustrated in FIG. 10, in the parking lot search process, the navigation device 40 determines whether a user has performed an operation to search for a parking lot (Step S81). When there is no operation to search for a parking lot (NO in Step S81), the navigation device 40 repeats the process of Step S81. When there is an operation to search for a parking lot (YES in Step S81), the navigation device 40 acquires information indicating the current automatic driving performance of the vehicle M equipped with the own device from the automatic driving control device 100 or the like in which the information is preset (Step S82).

Then, the navigation device 40 searches for a parking lot where the vehicle M can be parked by the current automatic driving performance thereof based on the information indicating the current automatic driving performance acquired by the process of Step S82 (Step S83). In Step S83, the navigation device 40 searches for the parking lot where the vehicle M can be parked by the current automatic driving performance among the parking lots around the destination based on, for example, the information indicating the automatic driving performance required for parking in each parking lot included in the first map information 43 and the information indicating the destination set by a user.

Next, the navigation device 40 makes an inquiry to, for example, the software distribution server 500 and determines whether there is rewritable software for the vehicle M (Step S84). When it is determined that there is no rewritable software (NO in Step S84), the navigation device 40 displays the parking lot searched by the process of Step S83, that is, the parking lot where the vehicle M can be parked by the current automatic driving performance (Step S85), and ends the parking lot search process illustrated in FIG. 10. In Step S85, the navigation device 40 displays, for example, the searched parking lot where the vehicle M can be parked by the current automatic driving performance on the display of the input and output device 42 in a state in which the user can identify the parking lot.

On the other hand, when it is determined that there is rewritable software (YES in Step S84), the navigation device 40 acquires information indicating the automatic driving performance of the vehicle M after the rewriting when the rewriting process is performed using the software from the software distribution server 500 (Step S86).

Next, the navigation device 40 determines whether the automatic driving performance of the vehicle M is changed by rewriting the software based on the information indicating the current automatic driving performance acquired by the process of Step S82 and the information indicating the automatic driving performance after rewriting acquired by the process of Step S85 (Step S87).

When it is determined that the automatic driving performance of the vehicle M does not change due to software rewriting (NO in Step S87), the navigation device 40 shifts to the process of Step S85.

On the other hand, when it is determined that the automatic driving performance of the vehicle M changes due to software rewriting (YES in Step S87), the navigation device 40 searches for a parking lot where the vehicle M can be parked by the automatic driving performance of the vehicle M after rewriting, that is, the automatic driving performance after the change (Step S88). In Step S88, the navigation device 40 searches, for example, a parking lot where the vehicle M can be parked by the automatic driving performance after the change, among the parking lots around the destination set by the user.

Then, the navigation device 40 displays the parking lot where the vehicle M can be parked by the current automatic driving performance, which is searched by Step S83, and the parking lot where the vehicle M can be parked by the automatic driving performance after change, which is searched by Step S88, to be distinguishable (Step S89), and then the navigation device 40 ends the parking lot search process illustrated in FIG. 10. In Step S89, the navigation device 40 displays, for example, the searched parking lot where the vehicle M can be parked by the current autonomous driving performance and the searched parking lot where the vehicle M can be parked by the automatic driving performance after change on the display of the input and output device 42 in a state in which the user can identify each other. An example of the display screen displayed by the process of Step S89 will be described below with reference to FIG. 12.

Here, an example in which Steps S81 to S83 are performed and then Step S84 and subsequent Steps are performed is described, but the invention is not limited thereto. Steps S81 to S83 and Step S84 and subsequent Steps may be performed separately. That is, Step S84 and subsequent Steps may be performed without performing Steps S81 to S83.

Usage Reservation Process

Next, an example of a usage reservation process performed by the navigation device 40 will be described. For example, when the navigation device 40 displays the parking lot searched by the parking lot search process illustrated in FIG. 10, the navigation device 40 performs the usage reservation process illustrated in FIG. 11.

Figure 11:
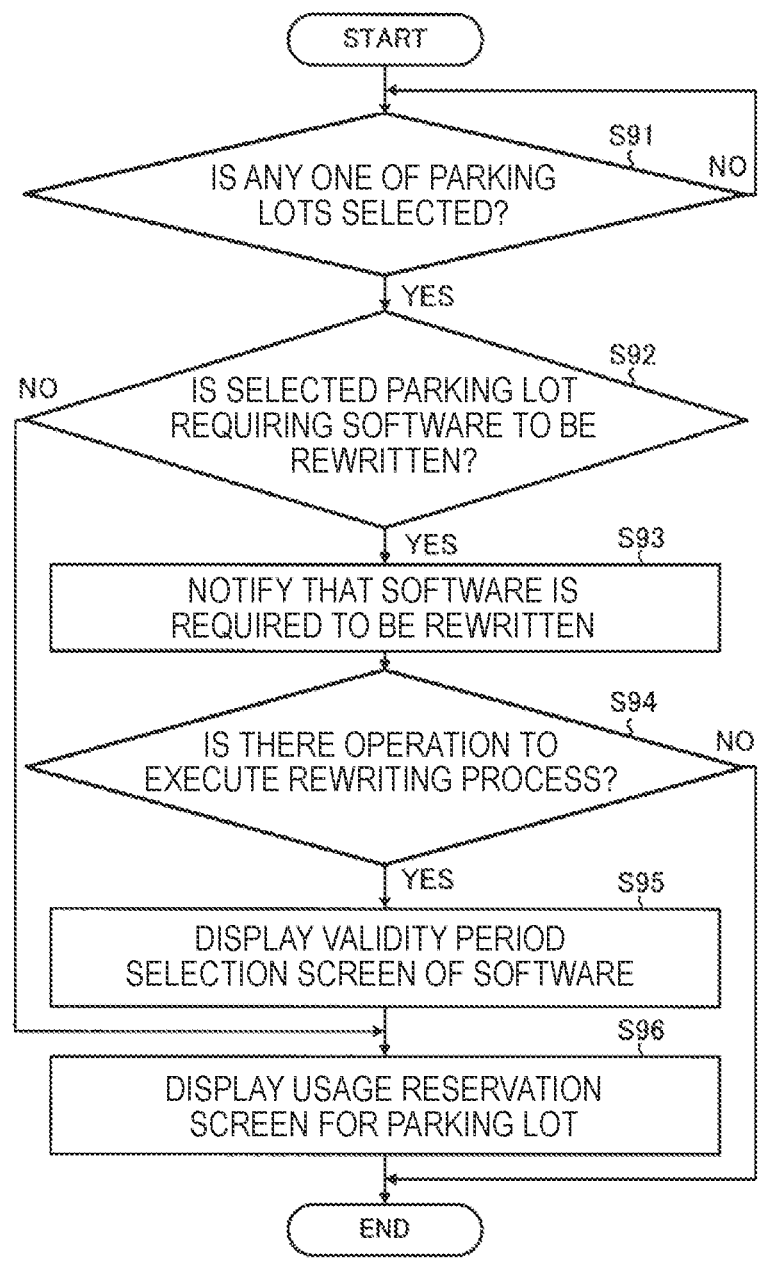
FIG. 11 is a flow chart illustrating an example of a parking lot search process performed by the navigation device.

As illustrated in FIG. 11, in the usage reservation process, the navigation device 40 determines, for example, whether any of the parking lots displayed by the process of Step S85 or the process of Step S89 described above has been selected by the user (Step S91). When there is no operation to select the parking lot (NO in Step S91), the navigation device 40 repeats the process of Step S91.

When there is the operation to select one of the parking lots (YES in Step S91), the navigation device 40 determines whether the selected parking lot is a parking lot which requires software rewriting (Step S92). For example, the navigation device 40 determines YES in Step S92 when the automatic driving performance required for parking the vehicle M in the selected parking lot is higher than the current automatic driving performance of the vehicle M. On the other hand, the navigation device 40 determines NO in Step S92 when the automatic driving performance required for parking the vehicle M in the selected parking lot is equal to or lower than the current automatic driving performance of the vehicle M.

When it is determined that the selected parking lot is a parking lot which does not require software rewriting (NO in Step S92), the navigation device 40 proceeds to the process of Step S96. On the other hand, when it is determined that the selected parking lot is a parking lot which requires software rewriting (YES in Step S92), the navigation device 40 notifies the user that the software needs to be rewritten (Step S93).

In Step S93, the navigation device 40 displays, for example, a message such as "You need to rewrite the software to park the vehicle in that parking lot. Do you want to rewrite the software?" and operation buttons corresponding to "Yes" and "No" on the display of the input and output device 42.

Then, the navigation device 40 determines whether there has been an operation to rewrite the software, that is, an operation to execute the rewriting process (Step S94). In Step S94, the navigation device 40 determines, for example, whether the operation button corresponding to "Yes" displayed by the process of Step S93 has been operated.

When there is the operation not to rewrite the software (NO in Step S94), that is, when the operation button corresponding to "No" displayed by the process in Step S93 is operated, the navigation device 40 ends the usage reservation process illustrated in FIG. 11. Here, for example, since the process of Step S96 described below is not performed, the user cannot make a reservation for using the selected parking lot (that is, the user cannot use the parking lot).

On the other hand, when there is an operation to rewrite the software (YES in Step S94), that is, when the operation button corresponding to "Yes" displayed by the process of Step S93 is operated, the navigation device 40 displays a predetermined validity period selection screen on the display of the input and output device 42 or the like (Step S95). Then, the navigation device 40 causes the user to input the validity period of the rewritten software via the validity period selection screen.

More specifically, on the validity period selection screen, the navigation device 40 displays a message such as "Please select the validity period of the software" and also displays the operation buttons corresponding to "1 day (price: 500 yen)" and "1 year (price: 5000 yen)" on the display of the input and output device 42, and the user is prompted to enter a desired validity period using the operation buttons.

Then, the navigation device 40 displays a usage reservation screen for inputting the vehicle ID, the scheduled enter date and time, the scheduled exit date and time, and the like on the display of the input and output device 42 (Step S96). Then, the navigation device 40 causes the user to make a usage reservation for the selected parking lot via the usage reservation screen and ends the usage reservation process illustrated in FIG. 11.

Example of Display Screen of Navigation Device

Figure 12:
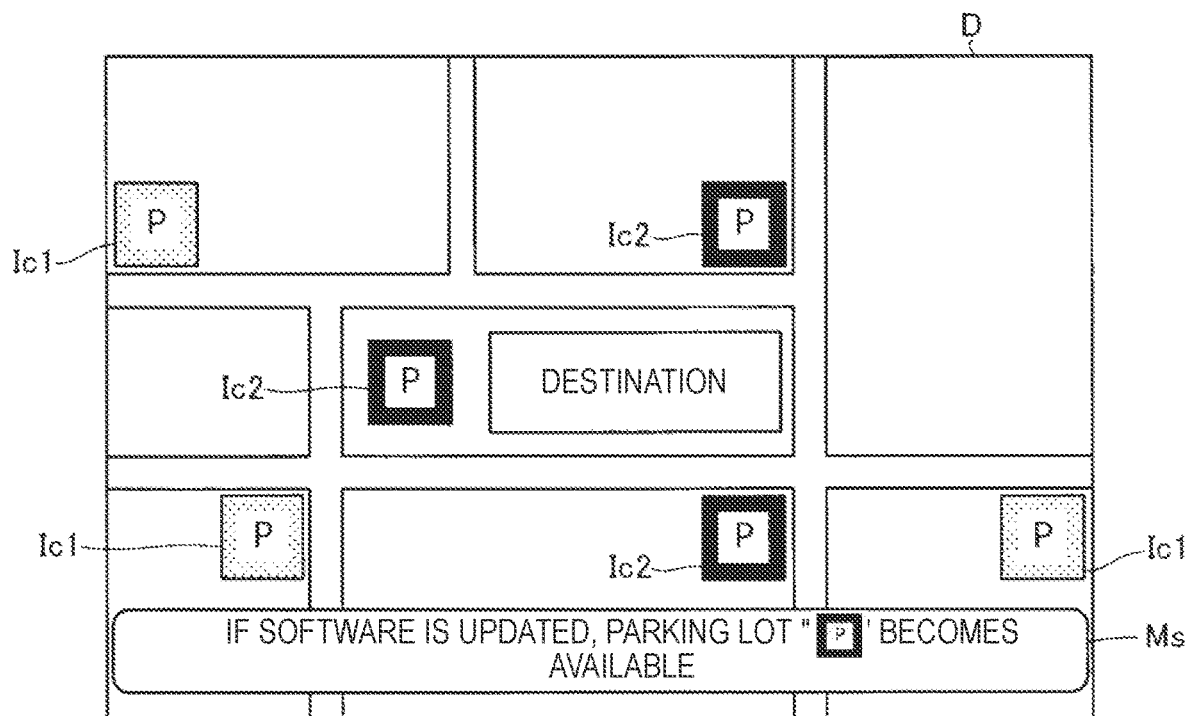
FIG. 12 is a flow chart illustrating an example of a usage reservation process performed by the navigation device.

Next, with reference to FIG. 12, an example of a display screen displayed by the navigation device 40 in Step S89 described above will be described. As illustrated in FIG. 12, the navigation device 40 displays a first icon Ic1 (for example, yellow icon) at a position corresponding to a parking lot (parking lot searched in Step S83) where the vehicle M can be parked by the current automatic driving performance on the map displayed on a display D of the input and output device 42. On the other hand, the navigation device 40 displays a second icon Ic2 (for example, red icon) of a type different from that of the first icon Ic1 at a position corresponding to a parking lot (parking lot searched in Step S87) where the vehicle M can be parked by the automatic driving performance after the change on the map.

Therefore, by referring to the first icon Ic1 and the second icon Ic2 displayed on the display D, the user can distinguish between the parking lot where the vehicle M can be parked by the current autonomous driving performance and the parking lot where the vehicle M can be parked by the searched automatic driving performance after the change and can know the location of each parking lot. In the example illustrated in FIG. 12, the user can know that, by rewriting the software of the vehicle M, it becomes possible to park in the parking lot close to (for example, adjacent to) the destination.

Further, as illustrated in FIG. 12, the navigation device 40 may display a message Ms on the display D informing that the vehicle M can be parked at the parking lot of the second icon Ic2 by rewriting the software. As a result, the user can easily know that the vehicle M can be parked at the parking lot of the second icon Ic2 by rewriting the software.

The invention is not limited to the embodiment described above and can be appropriately modified, improved, and the like.

For example, in the embodiment described above, an example is described in which the first performance acquisition unit 44, the second performance acquisition unit 45, and the processing unit 46 are provided in the navigation device 40 and the notification device for notifying the parking lot in which the vehicle M can be parked is realized by the navigation device 40, but the invention is not limited thereto. For example, the first performance acquisition unit 44, the second performance acquisition unit 45, and the processing unit 46 may be provided in the terminal device 300 and the notification device for notifying the parking lot in which the vehicle M can be parked may be realized by the terminal device 300.

Similarly, the notification device for notifying the parking lot in which the vehicle M can be parked may be realized by the automatic driving control device 100. Here, the automatic driving control device 100 may notify the parking lot in which the vehicle M can be parked by using, for example, the display of the input and output device 20.

In the embodiment described above, an example of executing the rewriting process in the parking lot PA is described, but the invention is not limited thereto. The place where the rewriting process is executed may be a place where the vehicle M is systematically parked (topped) and the software rewriting device 60 can acquire information indicating the scheduled parking time (scheduled stop time). The place where the rewriting process is executed is not limited to a public parking lot such as a parking lot PA, but may be a parking lot at an individual's home.

In the embodiment described above, an example in which a moving body is a vehicle is described, but the invention is not limited thereto.

The idea of the invention can be applied not only to vehicles but also to robots, ships, aircrafts, and the likes which have a drive source and can move by the power of the drive source. Similarly, the accommodation area may be a hangar, a berth, a parking apron, or the like.

At least the following matters are described in the specification. The components and the like corresponding to those of the embodiment described above are shown in parentheses, but the invention is not limited thereto.

(1) A software rewriting device (software rewriting device 60) capable of rewriting software of a moving body (vehicle M), the device comprising:

a required time acquisition unit (required time acquisition unit 611) that acquires information regarding a required time for rewriting the software;

a scheduled stop time acquisition unit (scheduled stop time acquisition unit 612) that acquires information regarding a scheduled stop time at a predetermined position (parking lot PA) of the moving body; and a rewriting processing unit (621) that executes a rewriting process of rewriting the software, in which when the required time is shorter than the scheduled stop time based on the information regarding the required time and the information regarding the scheduled stop time, the rewriting processing unit executes the rewriting process at the predetermined position, and when the required time is longer than the scheduled stop time based on the information regarding the required time and the information regarding the scheduled stop time, the rewriting processing unit does not execute the rewriting process at the predetermined position.

According to (1), when the required time for rewriting the software is shorter than the scheduled stop time at the predetermined position, the rewriting process is executed in the predetermined position. On the other hand, when the required time is longer than the scheduled stop time, the rewriting process is not executed at the predetermined position. As a result, when the rewriting process can be completed while the moving body is stopped at the predetermined position, the rewriting process is executed such that the software of the moving object can be rewritten while avoiding deterioration in the convenience of the user of the moving body.

(2) The software rewriting device according to (1), in which the scheduled stop time acquisition unit acquires information regarding scheduled stop time based on a scheduled stop start date and time and a scheduled stop end date and time of the moving body at the predetermined position.

According to (2), the information regarding the scheduled stop time is obtained based on the scheduled stop start date and time and the scheduled stop end date and time of the moving body at the predetermined position. Therefore, the information regarding the scheduled stop time that represents a period where the moving body is likely to be stopped can be acquired.

(3) The software rewriting device according to (2), in which when an operation is performed to execute the rewriting process before stopping the moving body at the predetermined position, the rewriting processing unit executes the rewriting process at the predetermined position.

According to (3), when the user of the moving body executes the operation to execute the rewriting process before stopping the moving body at the predetermined position, the rewriting process unit executes the rewriting process at the predetermined position. Therefore, the user does not feel distrust or discomfort while the software of the moving body can be rewritten.

(4) The software rewriting device according to any one of (1) to (3), in which the software rewriting device is configured to communicate with another device (software distribution server 500) that distributes the software, the rewriting process is a process of rewriting the software of the moving body with the software received from the other device, and when a communication environment of the software rewriting device at the predetermined position is equal to or higher than a predetermined level, the rewriting processing unit executes the rewriting process at the predetermined position.

According to (4), the rewriting process of rewriting the software of the moving body with the software received from the other device can be executed when the communication environment at the predetermined position is equal to or higher than the predetermined level. Therefore, when the software can be smoothly received from the other device at the predetermined position, the rewriting process can be executed.

(5) The software rewriting device according to (4), in which when the reception of the software from the other device is completed before the moving body is stopped at the predetermined position, the rewriting processing unit executes the rewriting process at the predetermined position even when the communication environment at the predetermined position is lower than the predetermined level.

According to (5), when the reception of the software from the other device is completed before the moving body is stopped at the predetermined position, the rewriting process is executed in a state where the moving body is stopped at the predetermined position even when the communication environment at the predetermined position is lower than the predetermined level. Therefore, the opportunity of executing the rewriting process can be increased.

(6) The software rewriting device according to any one of (1) to (5), in which the predetermined position is an accommodation area that can accommodate the moving body.

According to (6), the rewriting process can be executed when the moving body is accommodated in the accommodation area.

The invention claimed is:

1. A software rewriting device, configured to rewrite software of a moving body, comprising:

a required time acquisition unit configured to acquire information regarding a required time for rewriting the software;

a scheduled stop time acquisition unit configured to acquire information regarding a scheduled stop time at a predetermined position of the moving body based on a reservation for using the predetermined position; and a rewriting processing unit configured to execute a rewriting process of rewriting the software, wherein:

when the required time is shorter than the scheduled stop time based on the information regarding the required time and the information regarding the scheduled stop time, the rewriting processing unit executes the rewriting process at the predetermined position; and when the required time is longer than the scheduled stop time based on the information regarding the required time and the information regarding the scheduled stop time, the rewriting processing unit does not execute the rewriting process at the predetermined position.

2. The software rewriting device according to claim 1, wherein the scheduled stop time acquisition unit acquires information regarding scheduled stop time based on a scheduled stop start date and time and a scheduled stop end date and time of the moving body at the predetermined position.

3. The software rewriting device according to claim 2, wherein when a user of the moving body executes an operation to execute the rewriting process before stopping the moving body at the predetermined position, the rewriting processing unit executes the rewriting process at the predetermined position.

4. The software rewriting device according to claim 1, wherein:
the software rewriting device is configured to communicate with another device that distributes the software;
the rewriting process is a process of rewriting the software of the moving body with the software received from the other device; and
when a communication environment of the software rewriting device at the predetermined position is equal to or higher than a predetermined level, the rewriting processing unit executes the rewriting process at the predetermined position.

5. The software rewriting device according to claim 4, wherein
when the reception of the software from the other device is completed before the moving body is stopped at the predetermined position, the rewriting processing unit executes the rewriting process at the predetermined position even when the communication environment at the predetermined position is lower than the predetermined level.

6. The software rewriting device according to claim 1, wherein
the predetermined position is an accommodation area that can accommodate the moving body.

* * * * *